(12) United States Patent
Dang et al.

(10) Patent No.: US 7,895,097 B2
(45) Date of Patent: Feb. 22, 2011

(54) INTELLIGENT APPARATUS, SYSTEM AND METHOD FOR FINANCIAL DATA COMPUTATION, REPORT REMITTANCE AND FUNDS TRANSFER OVER AN INTERACTIVE COMMUNICATIONS NETWORK

(75) Inventors: Hong M. Dang, Los Gatos, CA (US);
Kooi K. Yap, Cupertino, CA (US);
Hwei-Hwa A. Lin, Cupertino, CA (US);
Martin Trostel, Boeblingen (DE)

(73) Assignee: Hewlett-Packard Development Company, L.P., Houston, TX (US)

( * ) Notice: Subject to any disclaimer, the term of this patent is extended or adjusted under 35 U.S.C. 154(b) by 1788 days.

(21) Appl. No.: 09/995,294

(22) Filed: Nov. 26, 2001

(65) Prior Publication Data

US 2003/0101111 A1  May 29, 2003

(51) Int. Cl.
*G07F 19/00* (2006.01)
(52) U.S. Cl. .......................................... 705/31; 705/30
(58) Field of Classification Search .................. 705/31, 705/30
See application file for complete search history.

(56) References Cited

U.S. PATENT DOCUMENTS

| | | | | |
|---|---|---|---|---|
| 5,539,883 | A * | 7/1996 | Allon et al. .................. | 718/105 |
| 5,644,724 | A | 7/1997 | Cretzler ...................... | 395/219 |
| 5,774,872 | A * | 6/1998 | Golden et al. ................. | 705/19 |
| 5,799,283 | A | 8/1998 | Francisco et al. ............. | 705/19 |
| 5,875,433 | A | 2/1999 | Francisco et al. ............. | 705/26 |
| 5,987,429 | A * | 11/1999 | Maritzen et al. .............. | 705/31 |
| 6,003,016 | A | 12/1999 | Hagemier .................... | 705/19 |
| 6,064,983 | A | 5/2000 | Koehler ....................... | 705/31 |
| 6,078,898 | A | 6/2000 | Davis et al. ................... | 705/19 |
| 6,078,899 | A | 6/2000 | Francisco et al. ............. | 705/19 |
| 6,183,140 | B1 | 2/2001 | Singer et al. ................. | 395/231 |
| 6,202,052 | B1 | 3/2001 | Miller ......................... | 705/31 |
| 6,298,333 | B1 | 10/2001 | Manzi et al. .................. | 705/31 |
| 6,347,304 | B1 * | 2/2002 | Taricani, Jr. ................. | 705/19 |
| 2002/0052792 | A1 * | 5/2002 | Johnson et al. ............... | 705/19 |
| 2002/0116302 | A1 * | 8/2002 | Wilmes et al. ................ | 705/31 |
| 2003/0040972 | A1 * | 2/2003 | Ryan et al. ................... | 705/26 |
| 2003/0040992 | A1 * | 2/2003 | Ryan et al. ................... | 705/31 |

(Continued)

FOREIGN PATENT DOCUMENTS

WO        WO 01/71606         *  9/2001

OTHER PUBLICATIONS

Taxware website printout, http://web.archive.org/web/20001110121300/www.taxware.com/Zproducts/products.htm, Nov. 2000.*

(Continued)

*Primary Examiner*—Elaine Gort

(57) ABSTRACT

A system for financial computation and revenue remittance over a network. A first-server providing e-content to users. A second receiving data from the first server and parsing the data. A third server receiving transactional data from the second server, parsing the data received for XML-based data and for interpreting the XML-based data for selected data processing operations. The XML-based data is stored by the third server in a first selected file of a first database, any taxes due on the corresponding transaction is computed and stored in a second selected first database file. A fourth server receiving XML-based data from the third server, converting the second selected first database file from an XML-based format to a TXP-based format for receipt by an automated clearinghouse network, and periodically transmitting the second file to a selected financial institution for remission of funds corresponding to the transactional data to the government authority.

11 Claims, 13 Drawing Sheets

U.S. PATENT DOCUMENTS

2003/0055883 A1* 3/2003 Wiles, Jr. .................... 709/203
2003/0097303 A1* 5/2003 Agee et al. .................... 705/19

OTHER PUBLICATIONS

Propel™ Announces Strategic Partnerships with Technology Leaders to Enrich the Propel™ Commerce System, PR Newswire, Feb. 12, 2001.*

White, Ron; How Computers Work; Que Corporation; Sep. 1999, pp. 102-104.*

Gage, Theodore Justin; "Tools Introduced to Aid with Growing EFT tax Payments"; Corporate Cashflow, vol. 14, Iss. 7; p. 12, 2 pgs; Jun. 1993.*

* cited by examiner

INTELLIGENT APPARATUS, SYSTEM AND METHOD FOR FINANCIAL DATA COMPUTATION, REPORT REMITTANCE AND FUNDS TRANSFER OVER AN INTERACTIVE COMMUNICATIONS NETWORK

BACKGROUND OF THE INVENTION

The present invention relates generally to data processing and, more particularly, to a novel apparatus, system and method for financial data computation and revenue remittance over an interactive communication network.

Domestic businesses are usually required by state and local authorities to charge sales and/or use tax for most commercial transactions relating to goods. Typically, each business is required to (i) calculate based upon a formula how much to charge for each transaction, (ii) file a return with the authorities identifying the amount of revenue collected, taxes accrued and any exemptions, (iii) periodically remit the amount of taxes owed to the authorities, (iv) issue check requests, and (iv) defend audits undertaken by such authorities.

Traditional methods of preparing and reporting tax information to government authorities have essentially been manual. In particular, at the close of each reporting period (monthly, quarterly or annually), financial representatives of the merchants, e.g., accountants, would consolidate all of the merchant's relevant sales and other transactional data and manually calculate the amount of sales and/or use tax owed. Selected forms, periodic tax payments, checks and other paperwork often necessary for reporting taxes would then be sent to the authorities via "snail mail". Since this process is essentially manual and is usually based only on information provided by the merchant, the merchant often had control over what was disclosed to their representative and, ultimately, what was reported to the authorities. Consequently, this practice allowed those relatively unscrupulous merchants to avoid paying taxes on considerable portions of their sales and other commercial transactions.

As a manual process, this method of tax compliance has also been prone to human error, not only in the accuracy of data collected, but also in the computation of the taxes owed. In addition, tax remittance was frequently delayed due to documents being late or lost in the mail, or merchants simply forgetting or otherwise omitting to remit sales and other transactional data to the authorities. The merchant would then be penalized for the late or incorrect tax payment.

With the advent of the computer, many businesses developed customized tax calculation systems in order to semi-automate the tax preparation process. While these systems have been useful, because businesses and their financial constructs vary widely, their software solutions often not only had to be tailored to each trade, but also applications had to be created that are specific to the particular requirements of each business. This resulted in considerable expense as well as delay in servicing the business's software needs. To further automate the tax preparation process, it was frequently necessary to integrate the tax software solutions with other business software. This required further customization of software applications as well as that of interface and other programs needed for integrating system-wide applications. Moreover, these systems frequently required trained personnel for effective operation and proper system maintenance. Despite the automation, an accounting staff was still required to monitor and review the accuracy of each tax calculation, and to prepare tax returns. This was especially true where the taxable transactions involved multiple tax jurisdictions, since traditional systems lacked the analytical capability for multi-jurisdictional tax decisions.

Still other systems required dedicated hardware and communications links. Although effective for some operations, these systems similarly required modification for application to new businesses, in other countries, or for purposes of monitoring transactions other than those for which it was designed. With the onset of e-commerce, while attempts have been made to adapt existing systems to the on-line environment, tax authorities have found themselves unable to monitor or collect sales tax on transactions that are conducted over the Internet.

Furthermore, such systems have experienced difficulty in maintaining high-level security, namely, privacy, authentication and integrity during system access and transaction processing. These issues have been found especially problematic during complex transactions or other tasks where large volumes of financial data are exchanged over the Internet. As the volume and complexity of transactions increased, the systems instantaneously had to compensate. When so burdened, conventional systems often struggle with operability, reliability, availability, scalability and load balancing, whereas the consumer, e.g., the financial industry, demands their on-line services twenty-four (24) hours a day, seven (7) days a week. To insure long term supportability, such systems must also utilize free public domain, commonly off-the-shelf (or CTOS), open source and other industry standard software.

Accordingly, a tax computation and reporting system is desired that automatically and intelligently identifies and monitors taxable transactions, correctly calculates in real-time the taxes due on the transaction, extracts any taxable transactions which require human intervention, and remits tax payments to government authorities without the need otherwise for human intervention.

SUMMARY OF THE INVENTION

According to one aspect of the present invention, an intelligent, program controlled system is provided with programming for identifying taxable financial transactions, collecting data based on the transactions, calculating any taxes due on the transactions, reporting the same to a selected government authority, and periodically remitting funds corresponding to the tax owed to the government authorities over an interactive communications network. The system comprises a first server for hosting a first virtual portal having at least one application for providing e-content to end users. The application preferably includes a network browser for accessing, displaying and transmitting data over the network. A second server is provided for hosting a second virtual portal having at least one application for receiving data from the first server and for parsing the data received. A communications infrastructure links the first and second servers to one another. Also provided is a third server for hosting a third virtual portal. This portal has at least one application for receiving transactional data from the second server, parsing the data received for XML-based data, interpreting the XML-based data for selected data processing operations, and for storing the XML-based data in a first selected file of a first database. In addition, the application computes any taxes due on the corresponding transaction and stores the tax due in a second selected first database file. Furthermore, a fourth server hosts a fourth virtual portal having at least one application for receiving XML-based data from the third server. The application converts the second selected first database file from an XML-based format to a TXP-based format for receipt by an automated clearinghouse network, and periodically transmits the second file, through the network, to a selected financial institution for remission of funds corresponding to the transactional data to the government authority.

In accordance with another aspect of the present invention, an intelligent, program controlled system is provided with programming for identifying taxable financial transactions, collecting data based on the transactions, calculating any taxes due on the transactions, reporting the same to a selected government authority, and periodically remitting funds corresponding to the tax owed to the government authorities over an interactive communications network. The system has a first server for hosting a first virtual portal with at least one application for providing e-content to end users. Preferably, the application includes a network browser for accessing, displaying and transmitting data over the network. A second server is provided for hosting a second virtual portal having at least one application for receiving data from the first server and for parsing the data received. A communications infrastructure links the first and second servers to one another. Also provided is a third server for hosting a third virtual portal. This portal has at least one application for receiving transactional data from the second server, parsing the data received for XML-based data, interpreting the XML-based data for selected data processing operations, and for storing the XML-based data in a first selected file of a first database. In addition, the application computes any taxes due on the corresponding transaction and stores the tax due in a second selected first database file. Furthermore, a fourth server is provided for hosting a fourth virtual portal having at least one application for receiving XML-based data from the third server. The application also converts the second selected first database file from an XML-based format to a TXP-based format for receipt by an automated clearinghouse network, and periodically transmits the second file, through the network, to a selected financial institution for remission of funds corresponding to the transactional data to the government authority. Finally, a fifth server hosts a fifth virtual portal having at least one application redundant to that of the third server, and a sixth server hosts a sixth virtual portal having at least one application redundant to that of the fourth server.

According to a further aspect of the present invention, there is provided an intelligent, program controlled system having programming for identifying taxable financial transactions, collecting data based on the transactions, calculating any taxes due on the transactions, reporting the same to a selected government authority, and periodically remitting funds corresponding to the tax owed to the government authorities over an interactive communications network. The system has a first server for hosting a first virtual portal having at least one application for providing e-content to end users. Preferably, the application includes a network browser for accessing, displaying and transmitting data over the network. A second server is provided for hosting a second virtual portal having at least one application for receiving data from the first server and for parsing the data received for XML-based data. A communications infrastructure links the first and second servers to one another. Also provided is a third server for hosting a third virtual portal. This portal has at least one application for processing XML-based data from the second server. The third server also hosts a standard interface for receiving the XML-based transactional, interpreting the XML-based data for selected data processing operations, and invoking processing of the XML-based data. Furthermore, a fourth server is provided for hosting a fourth virtual portal having at least one application for receiving transactional data from the third server. The application also stores the XML-based data in a first selected file of a first database, computes any taxes due on the corresponding transaction and stores the tax due in a second selected first database file. Moreover, a fifth server is utilized for hosting a fifth virtual portal. This portal has at least one application for receiving XML-based data from the fourth server and converting the second selected first database file from an XML-based format to a TXP-based format for receipt by an automated clearinghouse network. In addition, the application periodically transmits the second file, through the network, to a selected financial institution for remission of funds corresponding to the transactional data to the government authority. Finally, a sixth server hosts a sixth virtual portal having at least one application redundant to that of the fourth server, and a seventh server hosts a seventh virtual portal having at least one application redundant to that of the fifth server.

In accordance with still another aspect of the present invention, an intelligent, program controlled system is provided. The system has programming for identifying taxable financial transactions, collecting data based on the transactions, calculating any taxes due on the transactions, reporting the same to a selected government authority, and periodically remitting funds corresponding to the tax owed to the government authorities over an interactive communications network. The system comprises a first server for hosting a first virtual portal having at least one application for providing e-content to end users, the application preferably including a network browser for accessing, displaying and transmitting data over the network. A second server is provided for hosting a second virtual portal having at least one application for receiving data from the first server and for parsing the data received. A communications infrastructure links the first and second servers to one another. Also provided is a third server for hosting a third virtual portal having at least one application for receiving transactional data from the second server, parsing the data received for XML-based data and interpreting the XML-based data for selected data processing operations. The application also stores the XML-based data in a first selected file of a first database, computes any taxes due on the corresponding transaction and stores the tax due in a second selected first database file. In addition, a fourth server is provided for hosting a fourth virtual portal having at least one application for receiving XML-based data from the third server. The application also converts the second selected first database file from an XML-based format to a TXP-based format for receipt by an automated clearinghouse network, and periodically transmits the second file, through the network, to a selected financial institution for remission of funds corresponding to the transactional data to the government authority. Furthermore, at least one application is utilized for insuring system security over the interactive communications network, for system backup and recovery operations and for system real-time and continuous accessibility. Additionally provided by the application are operating system monitoring, system load balancing and scalability functions.

According to yet another aspect of the present invention, an intelligent, program controlled system is provided with programming for identifying taxable financial transactions, collecting data based on the transactions, calculating any taxes due on the transactions, reporting the same to a selected government authority, and periodically remitting funds corresponding to the tax owed to the government authorities over an interactive communications network. The system comprises a first server for hosting a first virtual portal having at least one application for providing e-content to end users. The application preferably includes a network browser for accessing, displaying and transmitting data over the network. A second server is provided for hosting a second virtual portal having at least one application for receiving data from the first server and for parsing the data received. A communications infrastructure links the first and second servers to one another. Also provided is a third server for hosting a third virtual portal having at least one application for receiving transactional data from the second server, parsing the data received for XML-based data, and interpreting the XML-based data for selected data processing operations. The application also stores the XML-based data in a first selected file of a first database, computes any taxes due on the corresponding transaction and stores the tax due in a second selected first database file. In addition, a fourth server for hosts a fourth virtual portal having at least one application for receiving XML-based data from the third server. The application also converts the second selected first database file from an XML-based format to a TXP-based format for receipt by an automated clearinghouse network, and periodically transmits the second file, through the network, to a selected financial institution for remission of funds corresponding to the transactional data to the government authority. Furthermore, at least one application is utilized for insuring system security over the interactive communications network, for system backup and recovery operations and for system real-time and continuous accessibility. Additionally provided by the application are operating system monitoring, system load balancing and scalability functions. Finally, a fifth server is used for hosting a fifth virtual portal having at least one application redundant to that of the third server, and a sixth server is provided for hosting a sixth virtual portal having at least one application redundant to that of the fourth server.

In accordance with still another aspect of the present invention is an intelligent, program controlled, service provider system. The system has programming for identifying taxable financial transactions, collecting data based on the transactions, calculating any taxes due on the transactions, reporting the same to a selected government authority, and periodically remitting funds corresponding to the tax owed to the government authority over an interactive communications network. The system comprises a first server for hosting a first virtual portal having at least one application for providing e-content to end users. The application preferably includes a network browser for accessing, displaying and transmitting data over the network. A second server is provided for hosting a second virtual portal having at least one application for receiving data from the first server and for parsing the data received. A communications infrastructure links the first and second servers to one another. Also provided is a third server for hosting a third virtual portal having at least one application for receiving data from the second server, parsing the data received for XML-based data and interpreting the XML-based data for selected data processing operations. A fourth server is used to process XML-based data from the third server. The fourth server includes a network service module having a plurality of modular functions, which comprise an applications module, a database module, a tax computation module and a tax remittance module. The network service module receives XML-based transactional data, stores the data in a first selected file of the database and computes any taxes due on the corresponding transaction. In addition, the module stores the tax due in a second selected file of the database, converts the second file from an XML-based format to a TXP-based format for receipt by an automated clearinghouse network, and periodically transmitting the second file, through the network, to a selected financial institution for remission of funds corresponding to the transactional data to the government authority. Furthermore, an infrastructure service module is provided which has a series of discrete modular functions. The functions include a security module for insuring system security over the interactive communications network, a system backup and recovery module, a real-time and continuous accessibility module, a system monitoring module and a system load balancing and scalability module.

According to yet a further aspect of the present invention is an intelligent, program controlled, service provider system with programming for identifying taxable financial transactions, collecting data based on the transactions, calculating any taxes due on the transactions, reporting the same to a selected government authority, and periodically remitting funds corresponding to the tax owed to the government authority over an interactive communications network. The system comprises a first server for hosting a first virtual portal having at least one application for providing e-content to end users. The application preferably includes a network browser for accessing, displaying and transmitting data over the network. A second server is provided for hosting a second virtual portal having at least one application for receiving data from the first server and for parsing the data received. A communications infrastructure links the first and second servers to one another. Also provided is a third server for hosting a third virtual portal having at least one application for receiving data from the second server. The application also parses the data received for XML-based data and interprets the XML-based data for selected data processing operations. In addition, a fourth server processes XML-based data from the third server, and includes a network service module having a plurality of modular functions. The functions comprise an applications module, a database module, a tax computation module and a tax remittance module. The network service module receives XML-based transactional data, stores the data in a first selected file of a database, computes any taxes due on the corresponding transaction and stores the tax due in a second selected file of the database. The module also converts the second file from an XML-based format to a TXP-based format for receipt by an automated clearinghouse network, and periodically transmits the second file, through the network, to a selected financial institution for remission of funds corresponding to the transactional data to the government authority. A second, infrastructure service module is provided, this module having a series of discrete infrastructure-related modular functions. The functions include a security module for insuring system security over the interactive communications network, a system backup and recovery module and a real-time and continuous accessibility module. Additionally utilized by the infrastructure service module are a system monitoring module and a system load balancing and scalability module. Finally, a fifth server is utilized for hosting a fifth virtual portal with at least one application redundant to that of the third server, and a sixth server is provided having a sixth virtual portal with at least one application redundant to that of the fourth server.

In accordance with still a further aspect of the present invention is an intelligent, program controlled, service provider system. The system has programming for identifying taxable financial transactions, collecting data based on the transactions, calculating any taxes due on the transactions, reporting the same to a selected government authority, and periodically remitting funds corresponding to the tax owed to the government authority over an interactive communications network. The system comprises a first server for hosting a first virtual portal having at least one application for providing e-content to end users. The application preferably includes a network browser for accessing, displaying and transmitting data over the network. A second server is provided for hosting a second virtual portal having at least one application for receiving data from the first server and for parsing the data received. A communications infrastructure links the first and second servers to one another. Also provided is a third server for hosting a third virtual portal having at least one application for receiving data from the second server. The application also parses the data received for XML-based data and interprets the XML-based data for selected data processing operations. In addition, a fourth server is utilized for processing XML-based data from the third server. The fourth server hosts a standard interface for receiving the XML-based data, interpreting the XML-based data to determine whether a transaction request is being made, and invoking processing of the XML-based data. Furthermore, a fifth server is utilized for processing XML-based data from the fourth server. This server includes a network service module having a plurality of modular functions, which comprise an applications module, a database module, a tax computation module and a tax remittance module. The service module receives XML-based transactional data, stores the data in a first selected file of a database, computes any taxes due on the corresponding transaction and stores the tax due in a second selected file of the database. The service module also converts the second file from an XML-based format to a TXP-based format for receipt by an automated clearinghouse network, and periodically transmits the second file, through the network, to a selected financial institution for remission of funds corresponding to the transactional data to the government authority. Additionally utilized is an infrastructure service module that has a series of discrete modular functions. The functions include a security module for insuring system security over the interactive communications network, a system backup and recovery module and a real-time and continuous accessibility module. Also provided are a system monitoring module and a system load balancing and scalability module. Finally, a sixth server hosts a sixth virtual portal having at least one application redundant to that of the fourth server, and a seventh server hosts a seventh virtual portal having at least one application redundant to that of the fifth server.

In accordance with another aspect of the present invention is an intelligent, program controlled, service provider system with programming for identifying taxable financial transactions, collecting data based on the transactions, calculating any taxes due on the transactions, reporting the same to a selected government authority, and periodically remitting funds corresponding to the tax owed to the government authority over an interactive communications network. The system includes a first server for hosting a first virtual portal having at least one application for providing e-content to end users. The application preferably includes a network browser for accessing, displaying and transmitting data over the network. A second server is provided for hosting a second virtual portal having at least one application for receiving data from the first server and for parsing the data received. A communications infrastructure links the first and second servers to one another. Also provided is a third server for hosting a third virtual portal. This portal has at least one application for receiving data from the second server, parsing the data received for XML-based data and interpreting the XML-based data for selected data processing operations. In addition, a fourth server is utilized for hosting a fourth virtual portal having at least one application for processing XML-based data from the third server. The fourth server includes a network service module having a plurality of modular functions, which comprise an applications module, a database module, a tax computation module and a tax remittance module. The network service module receives XML-based transactional data, stores the data in a first selected file of the database, computes any taxes due on the corresponding transaction and stores the tax due in a second selected file of the database. The service module also converts the second file from an XML-based format to a TXP-based format for receipt by an automated clearinghouse network, and periodically transmits the second file, through the network, to a selected financial institution for remission of funds corresponding to the transactional data to the government authority. Finally, a fifth server hosts a fifth virtual portal having at least one application for processing XML-based data from the third server. The fifth server includes an infrastructure service module that has a series of discrete modular functions including a security module for insuring system security over the interactive communications network, a system backup and recovery module and a real-time and continuous accessibility module. Additionally utilized are a system monitoring module and a system load balancing and scalability module.

According to a further aspect of the present invention, there is provided an intelligent, program controlled apparatus for identifying taxable financial transactions, collecting data based on the transactions, calculating any taxes due on the transactions, reporting the same to a selected government authority, and periodically remitting funds corresponding to the tax owed to the government authority over an interactive communications network. The apparatus has modular programming which comprises an applications module for receiving XML-based transactional data from a Web-based server and storing the data in a first selected file. Also included is a database module for storing the first selected file. A tax computation module computes any taxes due on the corresponding transaction and effects storage of the tax due in a second selected file of the database. Finally, a tax remittance module converts the second selected file from an XML-based format to a TXP-based format for use in an automated clearinghouse network. This module then periodically transmits the file, through the network, to a selected financial institution for remission of funds corresponding to the transactional data to the government authority.

In accordance with still another aspect of the present invention is a program controlled apparatus for also identifying taxable financial transactions, collecting data based on the transactions, calculating any taxes due on the transactions, reporting the same to a selected government authority, and periodically remitting funds corresponding to the tax owed to the government authority over an interactive communications network. The apparatus is provided with modular programming which includes an interface module for a subscriber system that electronically contacts a service provider system each time a taxable transaction is initiated. A tax computation module operates on a server of a service provider, the module identifying the jurisdiction from which the merchandise purchased has been shipped, the jurisdiction to which the merchandise is shipped, and the effective tax rates applicable from each jurisdiction. Also provided is a transaction processing module for consummating the transaction requested. A funds transfer module automatically receives information on the transaction consummation and effectes transfer of the funds electronically to an account of a selected financial institution. Next, a tax payment module periodically transfers funds aggregated in the account to at least one account of the government authority. A reporting/auditing module generates interactive reports and permits auditing by the government authority. Finally, a tax return module provides for automated generation of a tax return and transmits the return electronically to the government authority.

According to yet a further aspect of the present invention is an intelligent, program controlled system having programming for providing tax computation and remittance services over an interactive communications network. The system includes an applications service for receiving XML-based transactional data from a Web-based server and storing the data in a first selected file. It also includes a database service for storing the first selected file. A tax computation service computes the amount of tax due on the corresponding transaction and effects storage of the amount in a second selected file of the database. Finally, a tax remittance service converts the second selected file from an XML-based format to a TXP-based format for use in an automated clearinghouse network. The remittance service also periodically transmits the file, through the network, to a selected financial institution for remission of funds corresponding to the transactional data to the government authority.

According to a still a further aspect of the present invention is an intelligent, program controlled system with programming for identifying taxable financial transactions, collecting data based on the transactions, calculating any taxes due on the transactions, reporting the same to a selected government authority, and periodically remitting funds corresponding to the tax owed to the government authority over an interactive communications network. The system comprises an applications module for receiving XML-based transactional data from a Web-based server and storing the data in a first selected file. It also includes a database module for storing the first at selected file. A tax computation module computes any taxes due on the corresponding transaction and effects storage of the amount in a second selected file of the database. Finally, a tax remittance module converts the second selected file from an XML-based format to a TXP-based format for use in an automated clearinghouse network and periodically transmits the file, through the network, to a selected financial institution for remission of funds corresponding to the transactional data to the government authority.

In accordance with another aspect of the present invention is a program controlled system having modular programming for identifying taxable financial transactions, collecting data based on the transactions, calculating any taxes due on the transactions, reporting the same to a selected government authority, and periodically remitting funds corresponding to the tax owed to the government authority over an interactive communications network. The system has an interface module for a subscriber system that electronically contacts a service provider system each time a taxable transaction is initiated. A tax computation module operates on a server of a service provider, the module identifying the jurisdiction from which the merchandise purchased has been shipped, the jurisdiction to which the merchandise is shipped, and the effective tax rates applicable from each jurisdiction. In addition, a transaction processing module is utilized for consummating the transaction requested. A funds transfer module automatically receives information on the transaction consummation and effects transfer of the funds electronically to an account of a selected financial institution. Next, a tax payment module periodically transfers funds aggregated in the account to at least one account of the government authority. A reporting/auditing module generates interactive reports and permits auditing by the government authority. Finally, a tax return module provides automated generation of a tax return and transmits the return electronically to the government authority.

In accordance with yet a further aspect of the present invention is a method for identifying taxable financial transactions, collecting data based on the transactions, calculating any taxes due on the transactions, reporting the same to a selected government authority, and periodically remitting funds corresponding to the tax owed to the government authority over an interactive communications network. Initially, an XML-based transaction request is sent over the network from a subscriber computer system to a service provider computer system. Next, the XML-based transaction request is sent from the service provider system to a tax computation module and any taxes due for each taxable transaction is computed. A responsive XML-based reply is then sent to the subscriber system, the reply including the tax due and total amount due for the transaction. The subscriber system displays to the subscriber such tax due and the total amount due for the transaction. The reply is accepted so as to consummate the transaction. A second XML-based request is then sent from the subscriber system to the service provider system for activating a module for reporting the tax owed to the government authority, and a module for periodically remitting the tax owed over the network. Funds corresponding to the amount of the tax owed are transmitted to a service provider account. Periodically, a tax return based on the amount of the tax owed is generated and reported electronically to the government authority. Finally, and also periodically, the funds are transferred from the service provider account to the government authority in payment of the tax owed.

According to still another aspect of the present invention is a method for identifying taxable financial transactions, collecting data based on the transactions, calculating any taxes due on the transactions, reporting the same to a selected government authority, and periodically remitting funds corresponding to the tax owed to the government authority over an interactive communications network. First, a subscriber computer system subscribes to a service of a service provider computer system. Next, software is installed on the subscriber system for enabling communications over the network between the subscriber system and the service provider system. An XML-based transaction request is then sent from the subscriber system to the service provider system, the request identifying a class of goods being transacted, the value of a selected item of the goods, the subscriber location, the subscriber's identification number, the time of the message, the date and the shipping location. The XML-based transaction request is also sent from the service provider system to a tax computation module where any taxes due for each taxable transaction in each applicable jurisdiction is computed. A responsive XML-based reply is transmitted to the subscriber system, the reply including the tax due and total amount due for the transaction, and the subscriber system displays to the subscriber the tax due and total amount due for the transaction. Thereafter, the reply is accepted by the subscriber so as to consummate the transaction. A second XML-based message is sent from the subscriber system to the service provider system for activating a module for reporting the tax owed to the government authority, and for activating a module for periodically remitting funds over the network corresponding to the tax owed to the government authority. Periodically, a tax return is generated based on the amount of the tax owed and reported electronically to the government authority, and the funds are electronically transferred to a service provider account. Finally, the funds aggregated in the account are periodically transferred from the service provider account to the government authority.

It is, therefore, an object of the present invention to provide an intelligent, automated apparatus, system and method for computing sales and/or use tax owed on transactions and for remitting the same over an interactive communications network.

Another object of the present invention to provide an automated system for converting data in XML-based format from a tax computation system or the like to a TXP-based format for ready access by a selected financial institution.

A further object of the present invention is to provide an automated tax reporting and payment system for merchants or the like.

Still another object of the present invention is to provide an apparatus, a system and a method for remitting tax data over an interactive communications network so as to eliminate the need for manually filing a tax return.

Yet another object of the present invention is to provide a novel modular software system and infrastructure for servicing the tax preparation and submission needs of merchants or the like.

Still a further object of the present invention is to provide seamless, error free, automated tax computation and preparation services across multiple tax jurisdictions.

Another object of the present invention is to provide an apparatus, a system and a method for optimizing the speed of data transfer from an XML-based transaction performed by a tax computation system to a TXP compatible file for an automated clearinghouse network.

Yet another object of the present invention is to provide a reliable, automated apparatus, system and method for rapid transfer of XML-based transaction data from a tax computation system to TXP compatible data of an automated clearinghouse network and to transfer funds based on the transaction data to a selected government authority, simply, efficiently and economically.

Still another object of the present invention is to improve the speed and quality of data transfer between merchants, financial institutions and government authorities.

A further object of the present invention is to enhance data transfer over an interactive communications network.

Yet a further object of the present invention is to enable merchants to electronically outsource the burden of tax calculation and remittance to state-certified service providers.

Still another object of the present invention is to significantly reduce the internal information technology expenses of merchants by eliminating the need for an in-house internally-developed tax system.

Another object of the present invention is to significantly reduce the audit exposure of participating merchants by giving government authorities access to complete transaction records electronically maintained by a tax service provider.

A further object of the present invention is to make use of free public domain, commonly off-the-shelf (COTS) technologies, open source software and Internet software industry standards, such as XML, Java, HTTPS, SOAP, Secure Shell (SSH) and/or the like, rather than proprietary, subscriber-specific software, thereby reducing considerably tax system development and deployment costs of merchants or the like.

Still a further object of the present invention is to provide an intelligent, automated apparatus, system and method for computing the tax owed on sales transactions and remitting the same over an interactive communications network, with minimal human intervention.

The present invention will now be further described by reference to the following drawings which are not intended to limit the accompanying claims.

BRIEF DESCRIPTION OF THE DRAWINGS

The same numerals are used throughout the figure drawings to designate similar elements. Still other objects and advantages of the present invention will become apparent from the following description of the preferred embodiments.

DETAILED DESCRIPTION OF THE PREFERRED EMBODIMENTS

Figure 1:
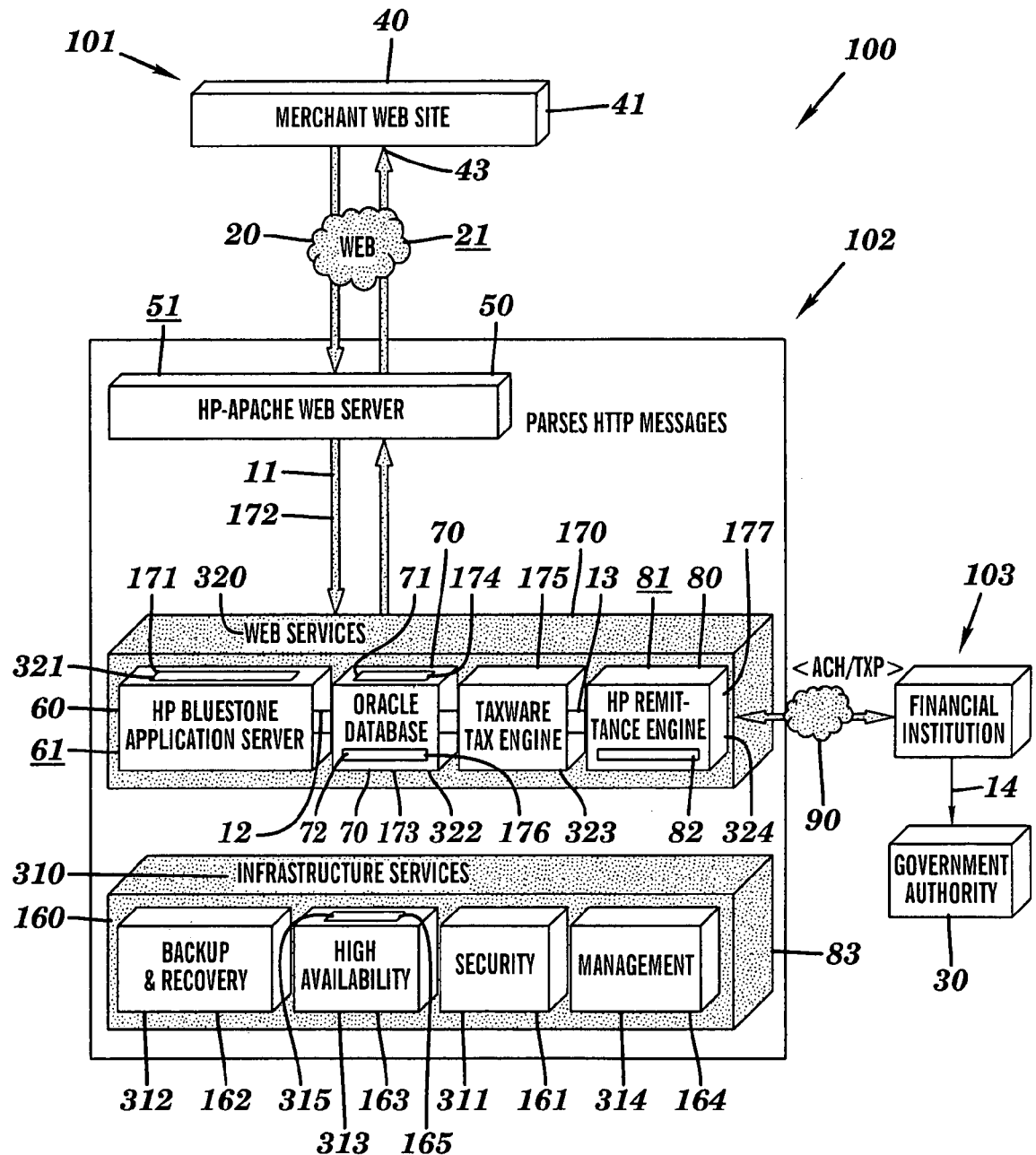
FIG. 1 is a flow diagram showing a system and a method for calculating taxes due on financial transactions, reporting the same to a selected government authority, and periodically remitting the tax owed over an interactive communications, according to one aspect of the present invention.

Referring now to the drawings and, more particularly, to FIGS. 1-14, there is shown a specific, illustrative, intelligent, program controlled apparatus 10, a system 100, a method 200 and a service 300 for financial data computation and revenue remittance over an interactive communications network 20, e.g., the Internet, an intranet, an extranet or the like. More particularly, a system is provided for identifying taxable financial transactions 11, collecting data 12 based on the transactions, calculating any taxes due 13 on the transactions, reporting the same to a selected government authority 30, and periodically remitting funds 14 corresponding to the tax owed to the government authority over the network.

Preferably, the present invention relates to a state-certified, automated sales and/or use tax calculation and payment system as well as an on-line service that utilizes relatively low cost, free public domain, commonly off-the-shelf (or CTOS) Web technologies, open source and other and Internet industry standard software, including XML, Java, HTTPS, SOAP, Secure Shell (SSH) and/or the like, such that tax collection, payment and filing of a tax return may be done automatically for any party that uses the system or subscribes to such a service. Such parties include taxpayers, e.g., merchants, vendors or the like. According to one aspect of the present invention, in return for real-time or otherwise timely tax related submission to the government authority, the subscriber is desirably offered a pre-programmed discount on his/her taxes.

Figure 3:
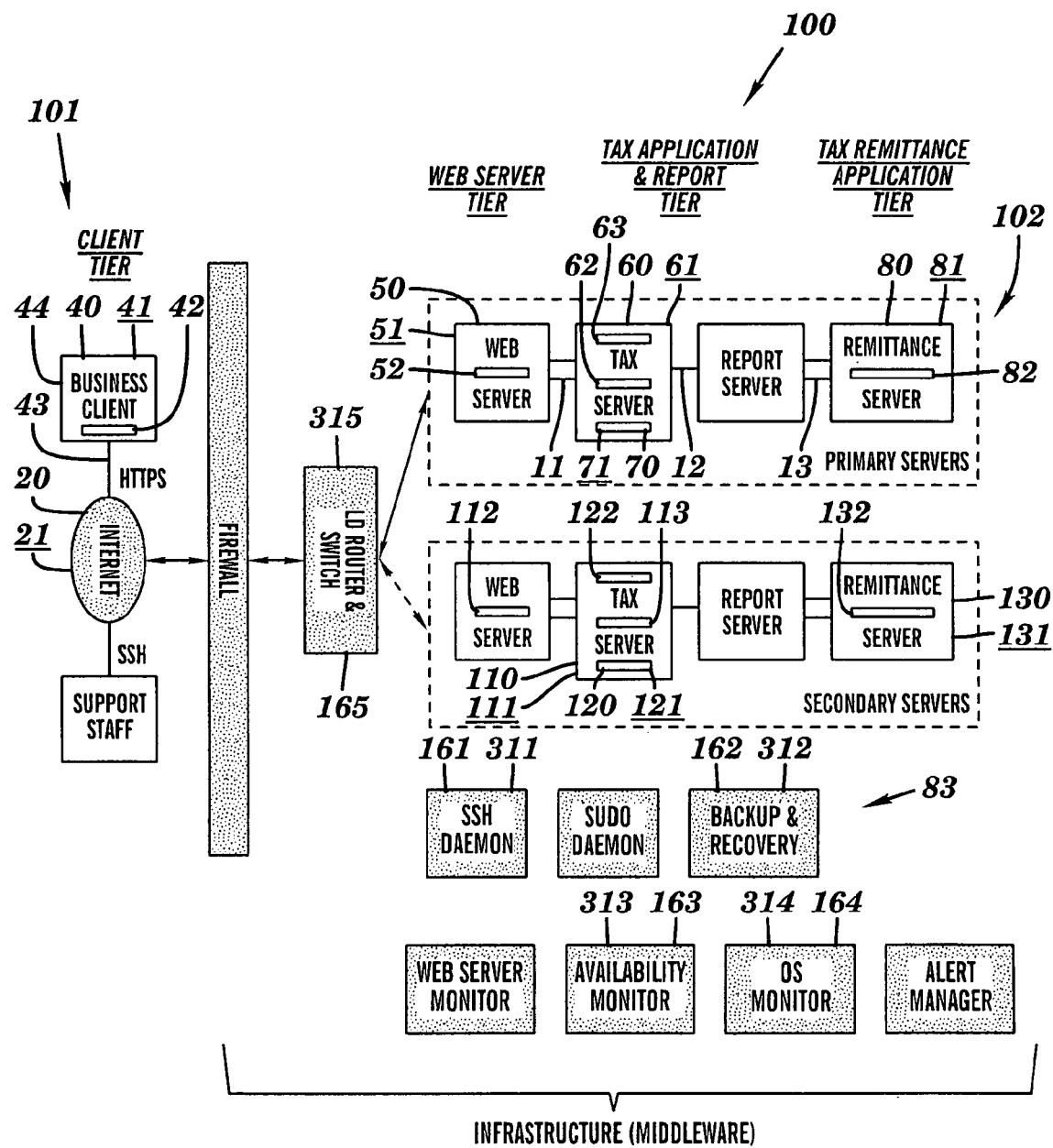
FIG. 3 is a flow diagram showing a system and a method for calculating taxes due on financial transactions, reporting the same to a selected government authority, and periodically remitting the tax owed over an interactive communications, according to another aspect of the present invention.
Figure 4:
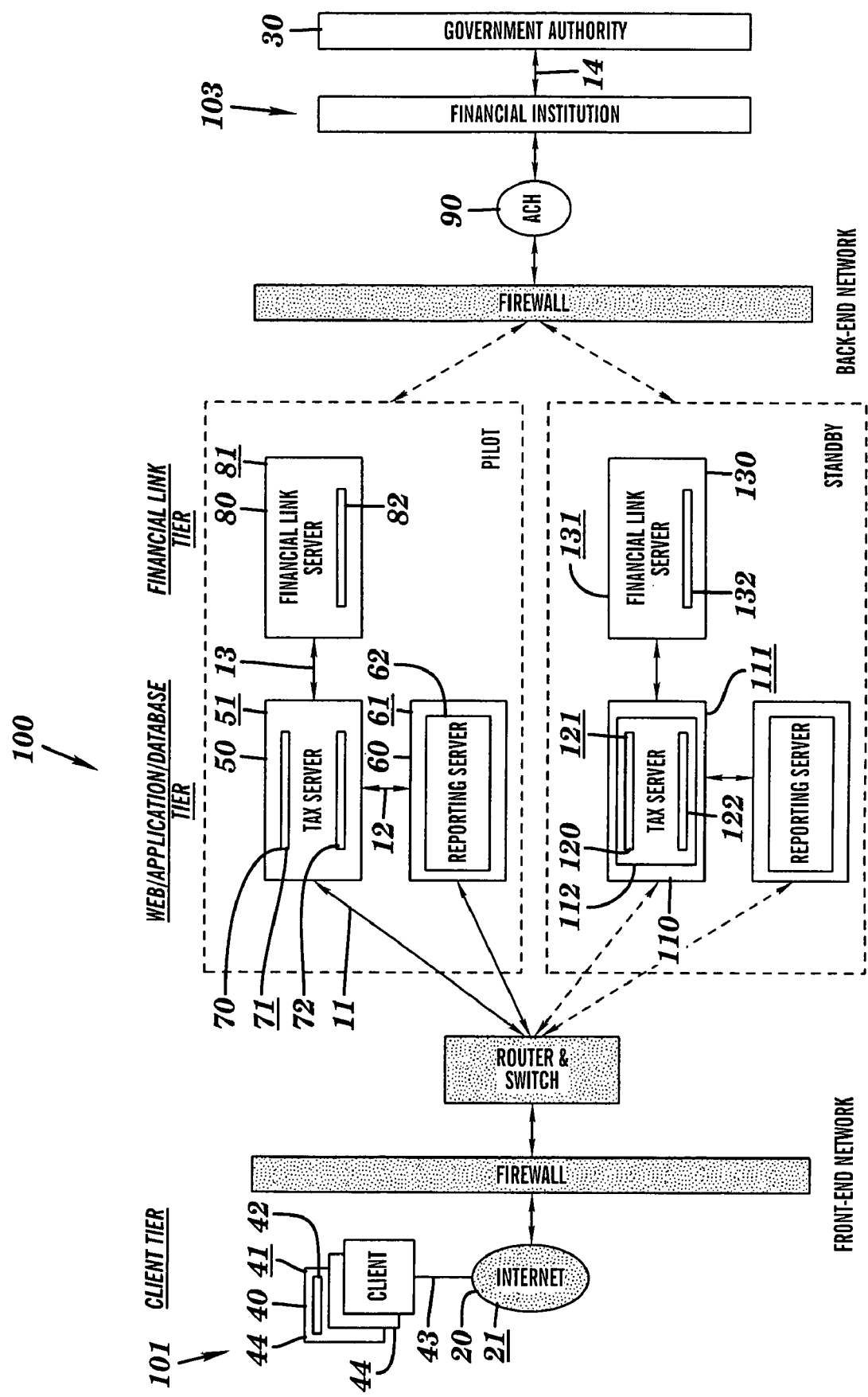
FIG. 4 is a flow diagram showing a system and a method for calculating taxes due on financial transactions, reporting the same to a selected government authority, and periodically remitting the tax owed over an interactive communications, according to a further aspect of the present invention.

Generally speaking, as best seen in FIGS. 1, 3 and 4, the system of the present invention includes a first server 40 for hosting a first virtual portal 41, e.g., conventional network communications software, having at least one application 42 for providing e-content 43 to end users 44, the application preferably utilizes a conventional network browser, e.g., Microsoft Explorer or the like, to access, display and transmit data over the network. Preferably, the first server is, or is part of, a subscriber computer system 101. A second server 50 is also provided for hosting a second virtual portal 51. The second portal desirably has at least one application 52 for receiving data from the first server and for parsing the data received to determine whether the data is from an authorized user. The first and second servers are interactively linked to one another by way of a communications infrastructure 21 of interactive communications network 20.

A third server 60 hosts a third virtual portal 61 where the at least one application 62 for receives transactional data from second server 50, parses the data received for XML-based data and interpreting the XML-based data for selected data processing operations. At least one application 63 also effects storage of the XML-based data in a first selected file 71 of a first database 70, computation of any tax due on the corresponding transaction and storing such tax due in a second selected database file 72.

A fourth component of the system is a fourth server 80 for hosting a fourth virtual portal 81. This portal is provided with at least one application 82 for receiving XML-based data from third server 60, converting second selected database file 72 from an XML-based format to a TXP-based format for receipt by an automated clearinghouse network 90, and periodically transmitting the second file, through the network, to a selected financial institution 103 for remission of funds 14 corresponding to the transactional data to government authority 30. At least one application 83 is also utilized for insuring system security over the interactive communications network, providing system backup and recovery operations, system real-time and continuous accessibility, operating system monitoring and system load balancing and scalability.

Figure 6:
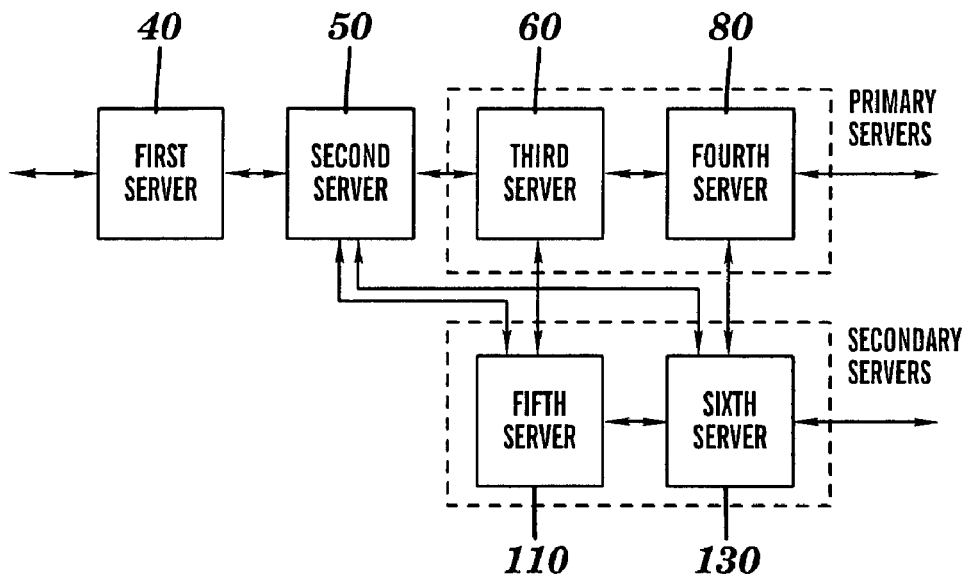
FIG. 6 is a flow diagram showing operative hardware of the system set forth in FIG. 3.

Alternatively or concurrently, as best seen in FIGS. 3, 4 and 6, a fifth server 110 is utilized that hosts a fifth virtual portal 111 having at least one application 112 redundant to that of the third server. In particular, the application receives transactional data from second server 50, parses the data received for XML-based data and interpreting the XML-based data for selected data processing operations. At least one application 113 also effects storage of the XML-based data in a first selected file 121 of a first database 120, computation of any tax due on the corresponding transaction and storing such tax due in a second selected database file 122.

Also alternatively or concurrently, a sixth server 130 hosts a sixth virtual portal 131 having at least one application 132 redundant to that of the fourth server. For instance, the application effects receiving of XML-based data from third server 60, converting second selected database file 122 from an XML-based format to a TXP-based format for receipt by an automated clearinghouse network 90, and periodically transmitting the second file, through the network, to a selected financial institution 103 for remission of funds 14 corresponding to the transactional data to government authority 20. At least one application 133 is also utilized for insuring system security over the interactive communications network, providing system backup and recovery operations, system real-time and continuous accessibility, operating system monitoring and system load balancing and scalability.

Figure 5:
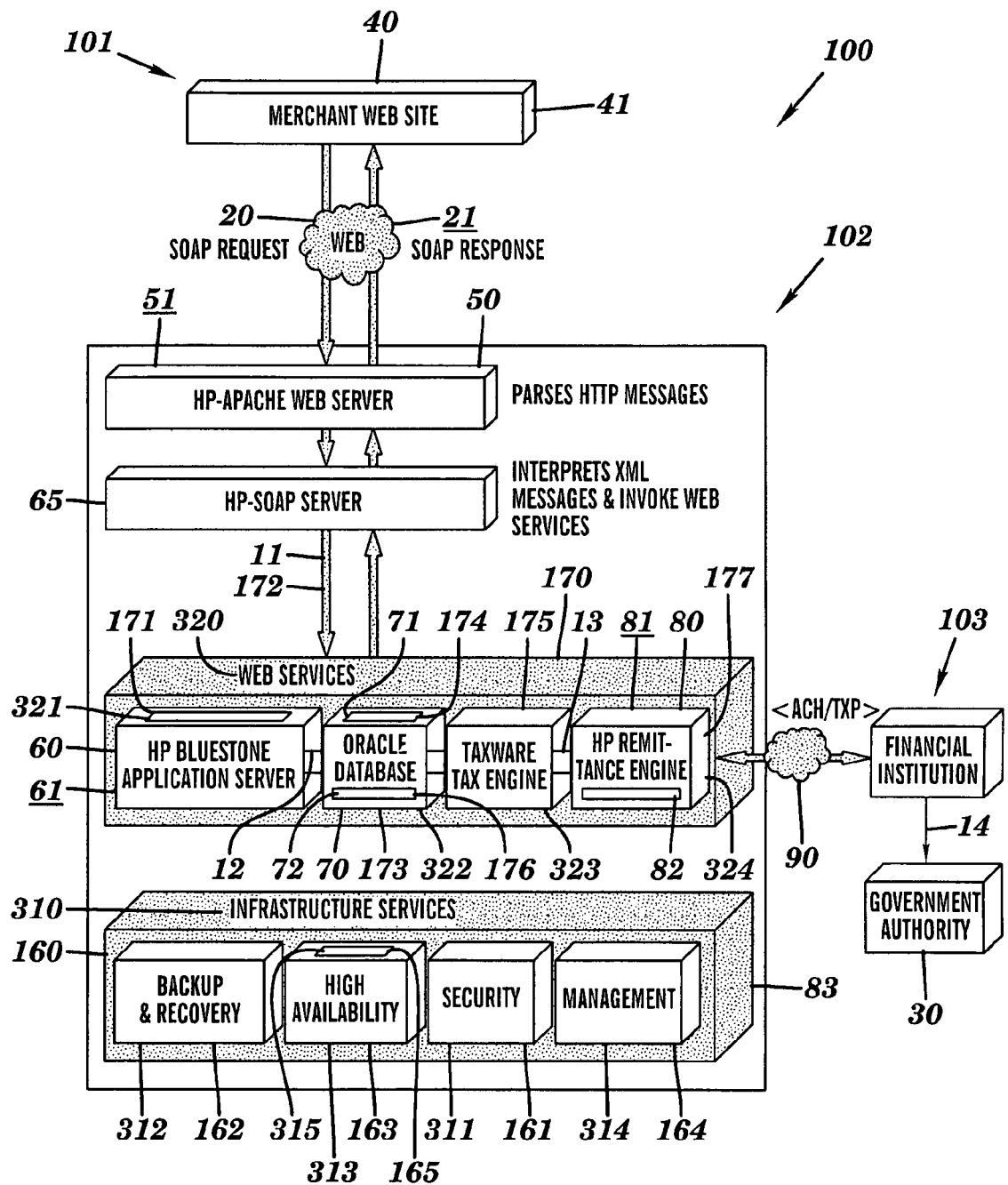
FIG. 5 is a flow diagram showing a system and a method for calculating taxes due on financial transactions, reporting the same to a selected government authority, and periodically remitting the tax owed over an interactive communications, in accordance with still another aspect of the present invention.
Figure 7:
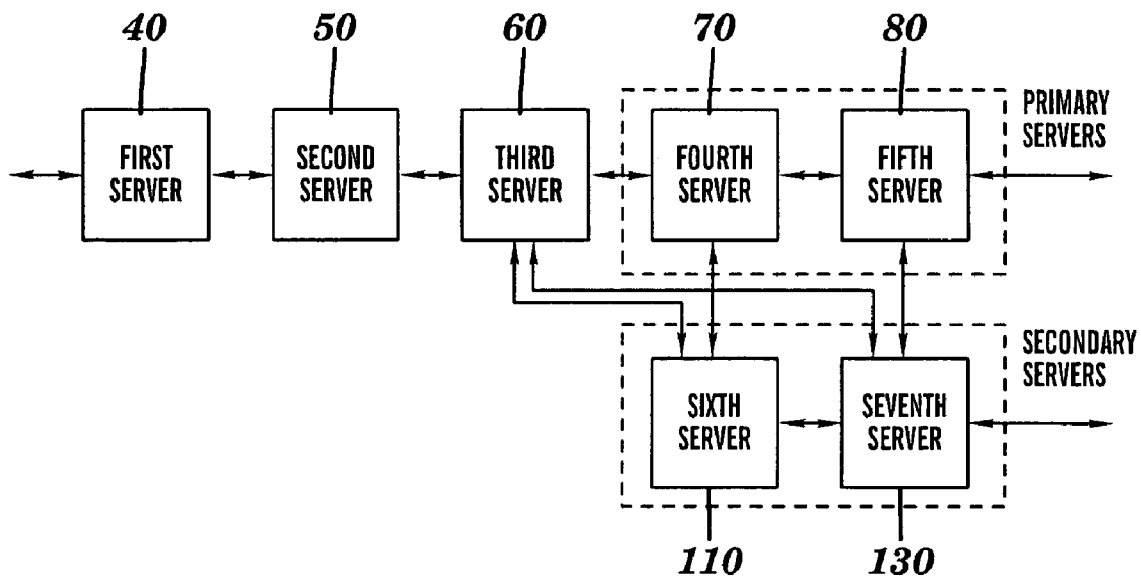
FIG. 7 is a flow diagram showing operative hardware of the system set forth in FIG. 3, according to another aspect of the present invention.

In another embodiment, as shown in FIGS. 5 and 7, virtual portal 61 has at least one application 64 for processing XML-based data from the second server. Third server 60 also hosts a standard interface 65, e.g., SOAP (simple object access protocol), for receiving the XML-based transactional data, interpreting the XML-based data for selected data processing operations, and invoking processing of the XML-based data. Alternatively, a server is provided for hosting standardized interface 65. In addition, fourth virtual portal 81 has at least one application 83 for receiving transactional data from the third server. The application also stores the XML-based data in first selected file 71 of first database 70, computes any tax due 13 on the corresponding transaction and stores such tax due in second selected database file 72.

Furthermore, by this embodiment, fifth server 110 is, instead, utilized for hosting a fifth virtual 111 portal having at least one application 114 for receiving XML-based data from the fourth server and converting the second selected database file from an XML-based format to a TXP-based format for receipt by automated clearinghouse network 90. In addition, this application periodically transmits the second file, through the network, to selected financial institution 103 for remission of funds 14 corresponding to the transactional data 12 to government authority 20.

Sixth server 130's sixth virtual portal 131 has at least one application 134 essentially redundant to that of the fourth server, and a seventh server 140 hosts a seventh virtual portal 141 with at least one application 142 redundant to that of the fifth server. Preferably, and more specifically, the sixth server also hosts a standard interface 135 for receiving the XML-based transactional data, interpreting the XML-based data for selected data processing operations, and invoking processing of the XML-based data. In addition, sixth virtual portal 131 has at least one application 136 for receiving transactional data from the third server and/or the fourth server. The application also stores the XML-based data in a first selected file 151 of a first database 150, computes any tax due 13 on the corresponding transaction and stores such tax due in a second selected database file 142.

Finally, portal 141 of the seventh server has at least one application 142 for receiving XML-based data from the fourth server and/or fifth server and converting the second selected database file from an XML-based format to a TXP-based format for receipt by automated clearinghouse network 90. In addition, this application periodically transmits the second file, through the network, to selected financial institution 103 for remission of funds 14 corresponding to the transactional data 12 to government authority 20.

Figure 8:
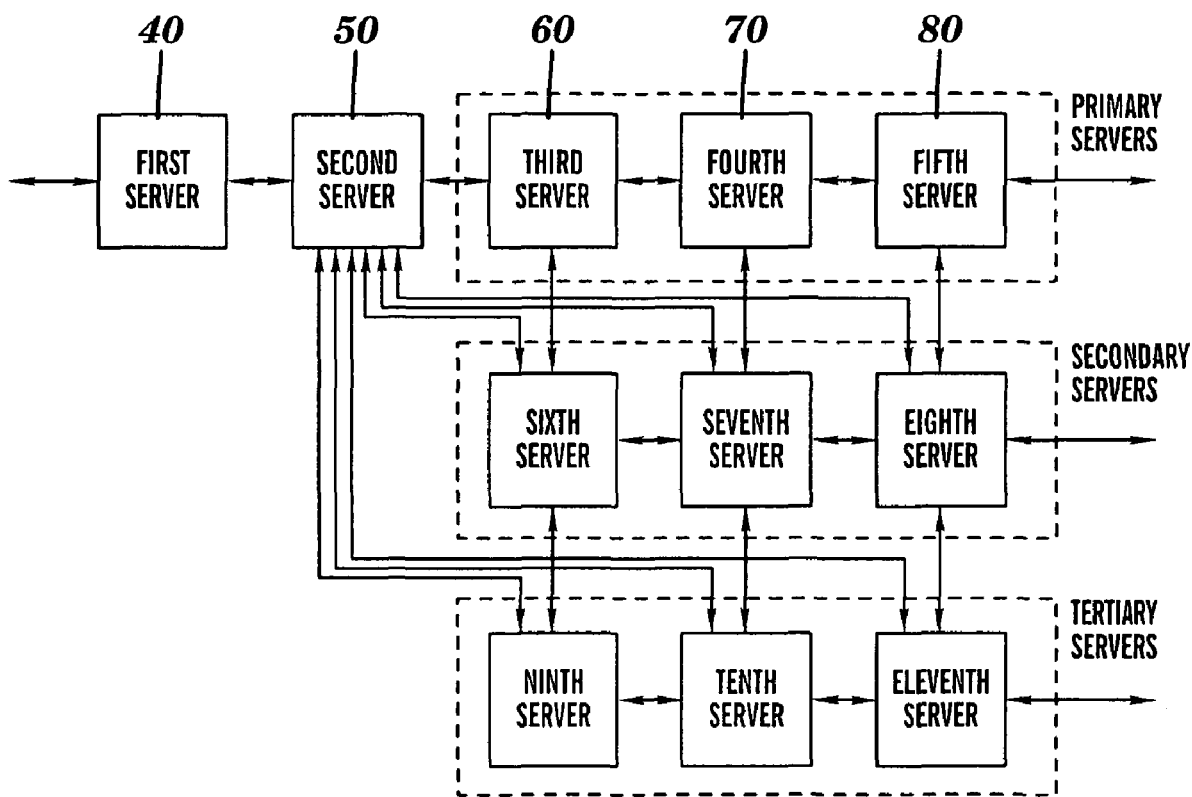
FIG. 8 is a flow diagram showing operative hardware of the system set forth in FIG. 3, in accordance with a further aspect of the present invention.

While selected servers of the present invention are described as having at least one application that is redundant to that of another server, it will be understood by those skilled in the art that a plurality of applications and/or all suitable applications on the one server are redundant to those of the other server such that one of the servers may operate as a backup to the other in at least one application, giving consideration to the purpose for which the present invention is intended. Preferably, and according to one embodiment, as shown in FIG. 4, the programming of one such server (or secondary server) is entirely redundant to that of the other server (or primary server) in order that seamless operation may be achieved upon any operating failure of the primary server. In addition, it will be appreciated that additional redundant or duplicate servers may be provided (i.e., tertiary server), as shown in FIG. 8, within the spirit and scope of the present invention.

Alternatively or concurrently, as illustrated in FIGS. 1 and 5, system operations are organized into two macro modules: an infrastructure module 160 for providing system or infrastructure services 310 and a network services module 170 for supplying Web-based or functional services 320. The present invention, in this connection, is directed to an intelligent, program controlled system having programming for providing tax computation and remittance services over interactive communications network 20.

In particular, the infrastructure module provides a series of discrete sub-modules or modular functions for providing infrastructure-related services. A first infrastructure module 161 is a security service 311 for insuring system security over the interactive communications network. The security operations conducted include, but are not limited to, encryption, access control, client/server authentication and/or the like. A second infrastructure module 162 provides recovery and backup functions 312, e.g., Oracle 8i export and import services. A third module 163 is a real-time, continuous operation, and accessibility function 313. This module insures both to subscribers and to government authorities that taxable transaction services are reliable and available relatively continuously, e.g., seven days a week twenty-four hours a day. A fourth module 164, a system monitoring function 314 allows the system of the present invention to be managed remotely by technical staff.

Further alternatively or concurrently, a fifth infrastructure module 165 provides system load balancing and scalability functions 315, e.g., supplied by a device such as an HP BlueStone Load Balancer/Switch. In particular, this function enables the system, upon detection of a relatively high volume data load, to scale itself up to handle such transactions and to evenly distribute such workload among available system resources.

An infrastructure of this general description is described, for example, in U.S. Patent Application Publication No. 2003/0101113, entitled INTELLIGENT SYSTEM INFRASTRUCTURE FOR FINANCIAL DATA COMPUTATION, REPORT REMITTANCE AND FUNDS TRANSFER OVER AN INTERACTIVE COMMUNICATIONS NETWORK, filed on Nov. 26, 2001, by Hong M. Dang, Hwei-Hwa A. Lin, Kooi K. Yap and Martin Trostel, the disclosure of which is hereby incorporated by reference herein in its entirety.

Figure 2:
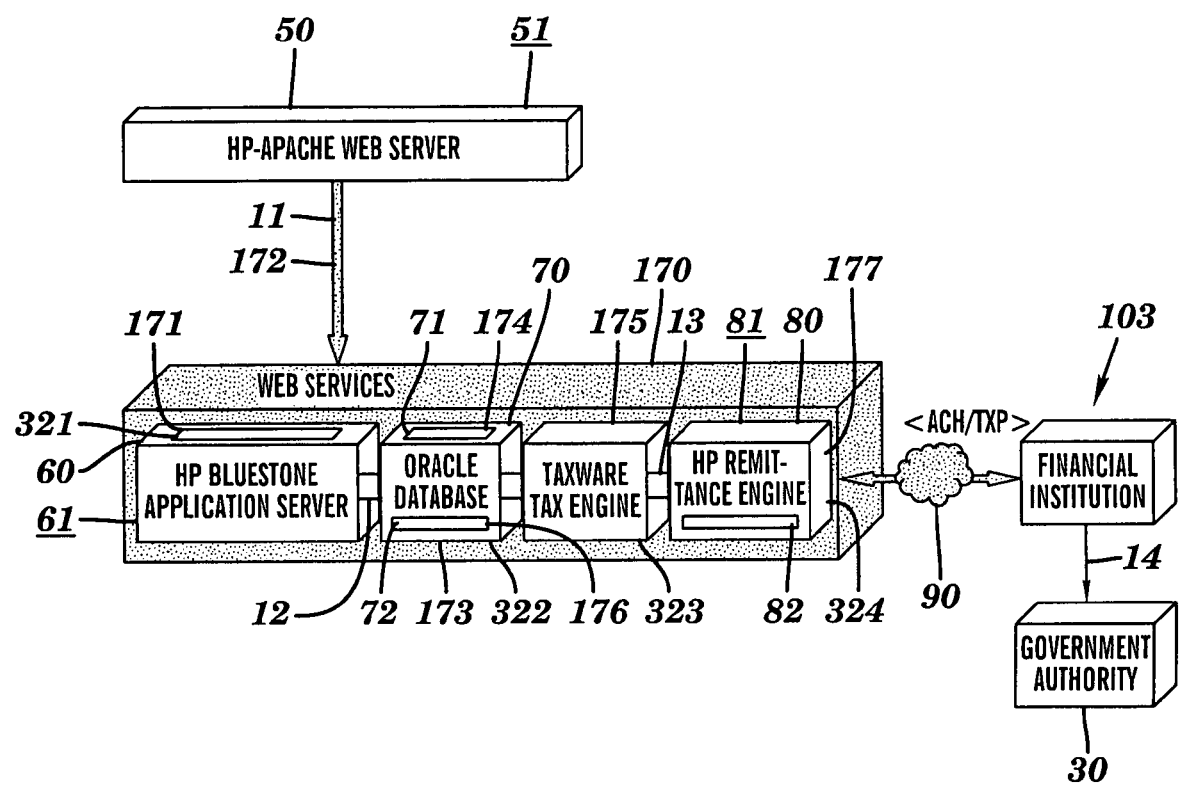
FIG. 2 is a flow diagram showing a network services module of the system and method of FIG. 1.

As for network services module 170, as shown in FIGS. 1 and 2, according to one aspect of the present invention, a series of discrete sub-modules or modular functions are provided for facilitating network-based services. Each module or function is preferably implemented according to industry standards, i.e., Web-based industry standards, such as XML, Java, HTTPS, SOAP, Secure Shell (SSH) and/or the like, such that the modules may operate collaboratively. Also, it is preferred that these modules be optimally organized into a central, network service module, e.g., on one or more servers, for data processing such as processing XML-based transaction requests.

More particularly, in one embodiment, the modules include a first module 171 for receiving an XML-based transaction request 172 from the second server and for storing transactional data for the request in a first selected file 174 of a database module 173. This corresponds to an applications service 321 provided by the system for receiving XML-based transactional data from a Web-based server, and a database service 322 for storing the data in the first selected file.

A second or tax computation module 175 computes any sales and/or use tax due on the corresponding transaction and effects storage of such tax due in a second selected file 176 of the database module. This module also provides a tax computation service 323 that computes the amount of any tax due on the corresponding transaction, and database service 322 that effects storage of the amount in the second selected file.

A third or tax remission module 177 converts the second selected database file from an XML-based format to a TXP-based format for use by automated clearinghouse network 90, and periodically transmits the second file, through the network, to selected financial institution 103 for remission of funds corresponding to the transactional data to government authority 20. This module provides tax remittance service 324.

In one embodiment, the foregoing resides more or less concurrently on a service provider computer system 102, the system having programming that comprises a plurality of modules operating preferably over the network. Alternatively or concurrently, the system operates over telephone lines through a conventional mail order system, or as part of a network for monitoring over-the-counter transactions.

Although the present invention is shown and described in the context of sending and receiving data in XML-based and TXP-based formats, it will be appreciated by those skilled in the art that other suitable data formats may be utilized, within the spirit and scope of the present invention. Moreover, while the present invention is presented as having each of its functions, whether network services or infrastructure-based, in relatively distinct software modules, it is understood that operative aspects of these functions may be structured in a non-modular fashion, in clusters of modules and non-modules, or in any combination thereof, giving consideration to the purpose for which the present invention is intended.

Generally speaking, according to one aspect of the present invention, automated clearinghouse network (or ACH) 90, or access thereto, is provided for facilitating the transfer of funds to government authorities. In one embodiment, ACH is a nationwide, batch-oriented electronic funds transfer system that provides for interbank clearing of electronic payments 91 for participating depository financial institutions 92, e.g., Citibank. Examples include The American Clearinghouse Association, Federal Reserve, Electronic Payments Network and VISA. Each of these institutions, in effect, act as a central clearing facility (or ACH operator) through which member financial institutions can transmit or receive entries through the automated clearing house.

Figure 12:
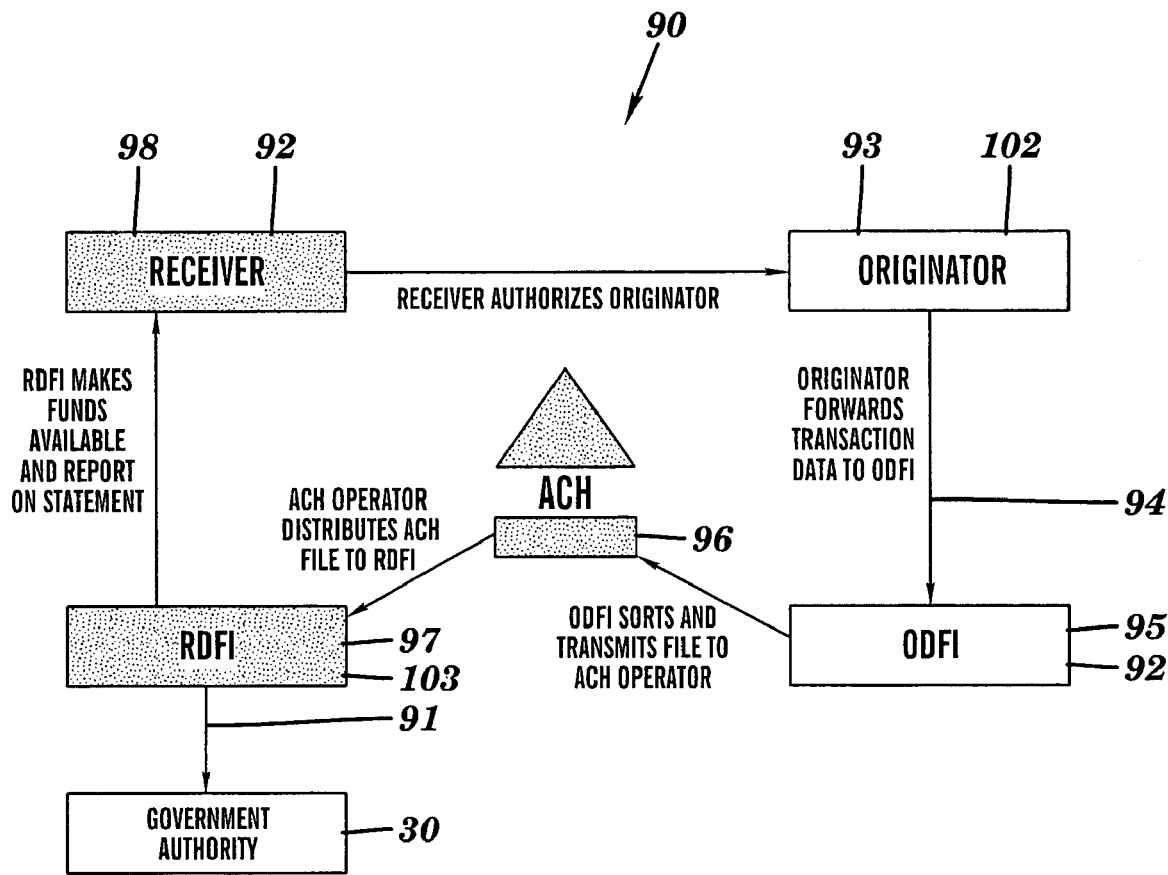
FIG. 12 is a flow diagram showing an automated clearinghouse network, according to one aspect of the present invention.

Operation of the clearinghouse network is illustrated, for instance, in FIG. 12. In one embodiment, an originator 93, such as an individual, a corporation or other entity, that desires access to the network initiates entries in the automated clearinghouse network. This is typically done by forwarding a file 94 containing processed tax transaction data to an originating depository financial institution (or ODFI) 95. An ODFI is a participating financial institution that originates automated clearinghouse network entries at the request of and by agreement with its customers. Typically, ODFI's are bound by provisions of the NACHA standard industry operating rules and guidelines. The ODFI sorts and transmits the data file to an automated clearinghouse network operator 96.

Next, the network operator distributes the data file to a receiving depository financial institution (or RDFI) 97. An RDFI is typically any financial institution qualified to receive automated clearinghouse network entries that also agrees to abide by the NACHA standard industry operating rules and guidelines. The RDFI makes funds corresponding to the data file available and then reports them on a statement to a receiver 98. The receiver is preferably an individual, a corporation or other entity authorized as an originator, i.e., to initiate a credit or debit entry to a transaction account held at the RDFI.

The foregoing description is provided for purposes of illustration and not to limit the intended environment or application of the present invention. The remaining structural and functional aspects of automated clearinghouse networks are known by those skilled in the art and further description is considered unnecessary for illustration of the present invention.

The use of an automated clearing house banking network for performing electronic funds transfer (or EFT) provides many advantages over conventional methods which utilize a credit card service for sales and/or use tax payment. First, this network is considerably less expensive that performing electronic funds transfers using a credit card service. For instance, with an automated clearinghouse network, it typically costs only a few cents to execute each electronic funds transfer regardless of the amount of the transaction. A credit card transaction, on the other hand, usually involves a charge of 2%-3% of the transaction amount. Since the cost of an automated clearinghouse network funds transfer is fixed, whereas the cost of a credit card transaction increases in proportion to the size of the amount transferred, the cost savings associated with the use of the automated clearinghouse network can be very large.

In addition, the automated clearinghouse network is currently the primary way in which most domestic financial institutions accomplish electronic funds transfers. Example ACH transactions include most payroll deposits, automatic mortgage payments and car payments. Moreover, the automated clearinghouse network is advantageous in being the standard network supported by all states for sales tax remittance. The defined standard file format for sales tax remittance to all states is ACH/TXP.

Figure 9:
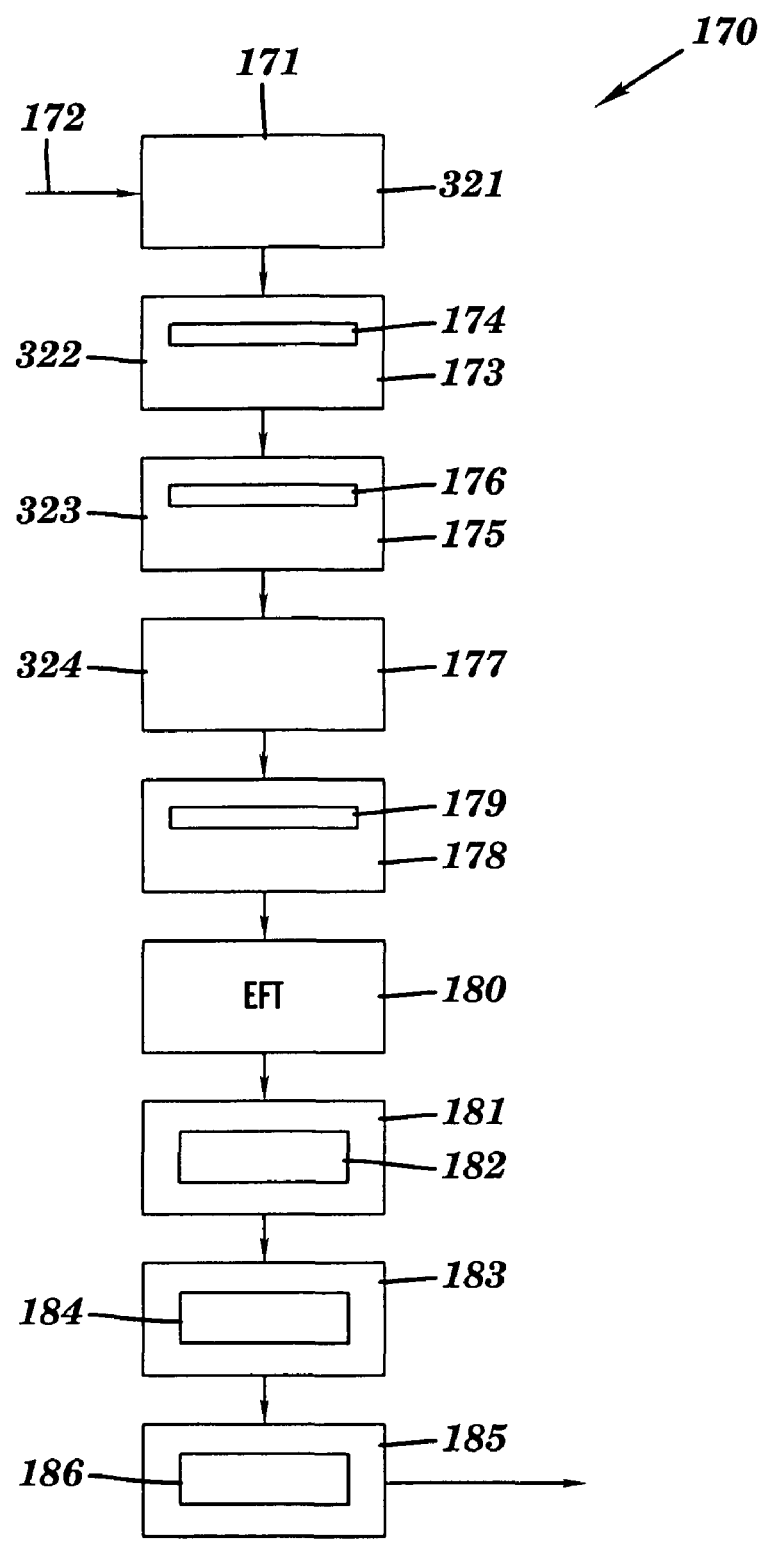
FIG. 9 is a flow diagram showing the network services module of FIG. 2, according to another aspect of the present invention.
Figure 14:
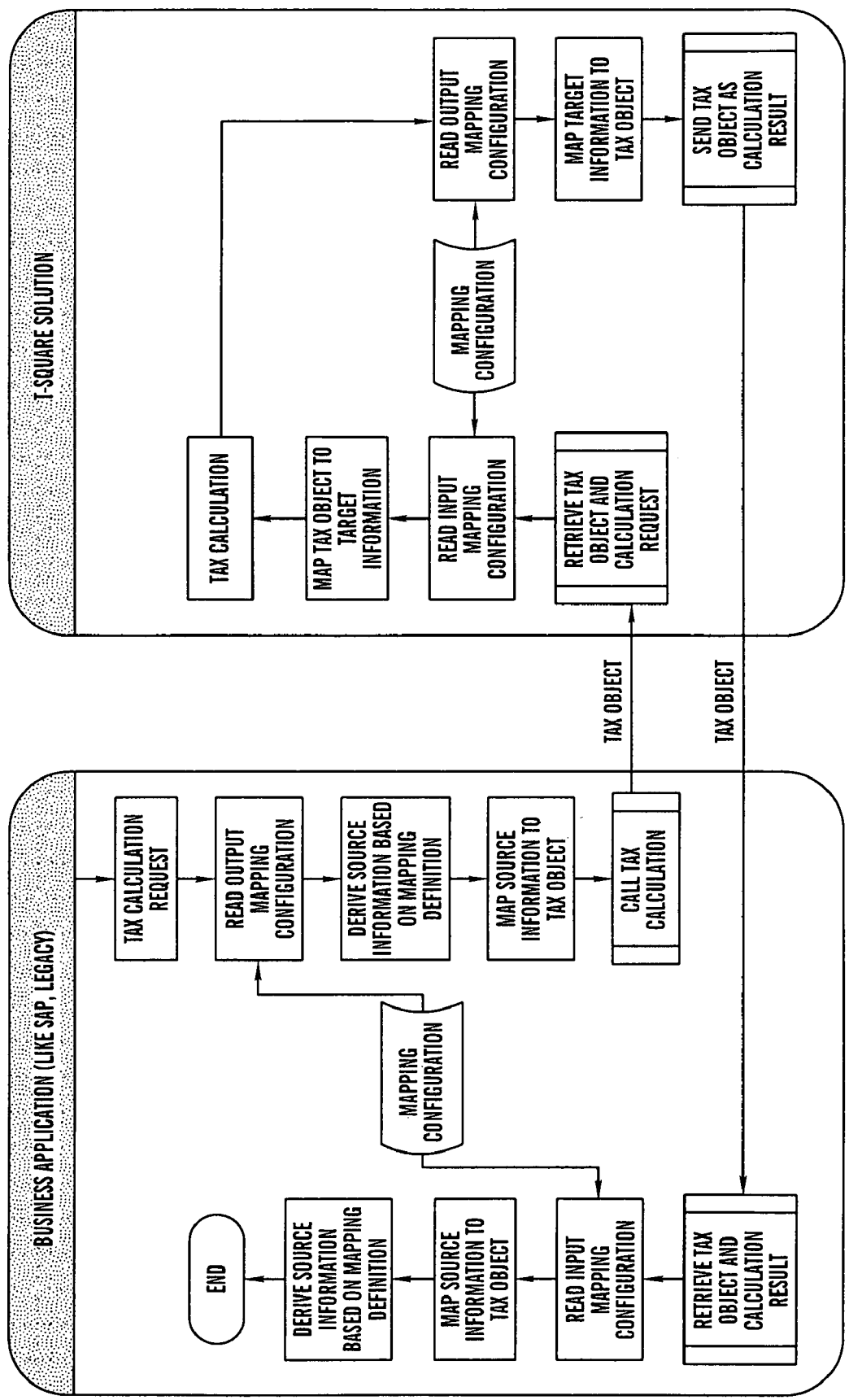
FIG. 14 is a flow diagram showing a tax computation module for subscribers and a business application, according to one aspect of the present invention.

Referring now with greater specificity to operative components of network services module 170, as best seen in FIG. 9, they include first module 171 or interface for subscriber system 101 that electronically contacts service provider system 102, preferably located remotely thereto, each time a taxable transaction is initiated. This interface takes the form of an industry standard interface, e.g., simple object access protocol (or SOAP). Alternatively or concurrently, a novel industry standard interface is utilized, as shown in FIG. 14. An interface of this general description is set forth, for instance, in U.S. Patent Application Publication No. 2003/0105687, entitled METHODS, DATA RECORD, SOFTWARE INTERFACE, DATA WAREHOUSE MODULE AND SOFTWARE APPLICATION FOR EXCHANGING TRANSACTION-TAX-RELATED DATA, filed on Nov. 26, 2001, by Wolfgang Bross, Norbert Heumueller, Fritz Oesterle, Gulati, Robert J. Gallagher, Theresa O. Watson, Natalie D. Milner-Upshaw, Penny L. Arviso, Paul J. Kunzler and Barry Schneiderman, the disclosure of which is hereby incorporated by reference herein in its entirety.

It is preferred that second module 175 operate as a tax computation engine, desirably also operating on a server of the remotely located service provider. For instance, this engine identifies the jurisdiction from which the merchandise purchased has been shipped, the jurisdiction to which the merchandise is shipped, the effective sales and/or use tax rates applicable from each jurisdiction, and related information. In one embodiment, sales and/or use tax computation is performed by conventional software, e.g., Taxware, a product of Taxware International, Inc.

Alternatively or concurrently, the solution is provided by an enhanced software system for computation of sales and/or use tax for payments and accruals, e.g., T-Square. A system of this general description is described, for example, in U.S. Patent Application Publication No. 2003/0101112, entitled INTELLIGENT APPARATUS, SYSTEM AND METHOD FOR FINANCIAL DATA COMPUTATION AND ANALYSIS, filed on Nov. 26, 2001, by Robert J. Gallagher, Theresa O. Watson, Natalie D. Milner-Upshaw, Penny L. Arviso, Paul J. Kunzler and Barry Schneiderman, the disclosure of which is hereby incorporated by reference herein in its entirety.

Next, and also alternatively or concurrently, a third network services module 178 is provided relating to a transaction processing system 179. This system essentially consummates each transaction corresponding to the transaction request received. The system may take the form, for instance, of an e-commerce system, a procurement system, an accounts payable system, or the like.

A fourth component of the network services module is an electronic funds transfer system (or EFT) 180. This module automatically receives information, upon consummation of each transaction, and automatically effects transfer of funds corresponding to the tax owed electronically to a central account, e.g., at selected financial institution 103. A fifth module 181 relates to a tax payment system 182 that periodically, i.e., bi-weekly, monthly, quarterly or the like, removes funds 14 aggregated from a series of transactions from the central account and electronically transfers them to one or more accounts 31 of government authority 30. Finally, a sixth module 183 provides a reporting/auditing system 184 for interactive report generation and auditing by the government. Finally, a seventh module 185 utilized is an automated tax return generation and electronic filing system 186.

Figure 13:
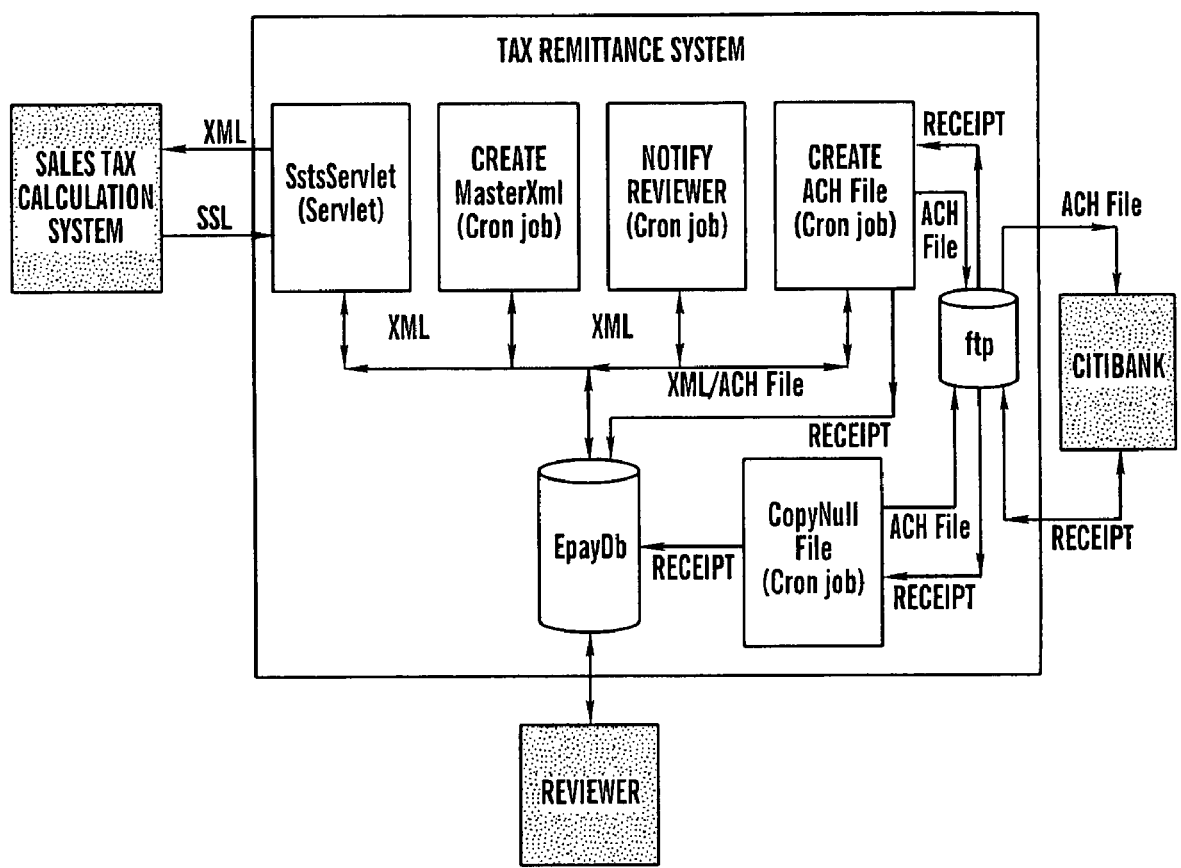
FIG. 13 is a schematic diagram showing a module for remitting tax related information to a selected financial institution, according to one aspect of the present invention.

Shown in FIG. 13 is a preferred, enhanced transaction tax system for reporting tax related data and remitting funds relating to the same. A system of this general description is described, for example, in a co-pending U.S. patent application Ser. No. 09/995,190, entitled APPARATUS, SYSTEM AND METHOD FOR REPORTING FINANCIAL DATA AND REMITTING FUNDS OVER AN INTERACTIVE COMMUNICATIONS NETWORK, filed on the same date herewith by Hong M. Dang, Hwei-Hwa A. Lin, Martin Trostel and Kooi K. Yap, the disclosure of which is hereby incorporated by reference herein in its entirety.

To utilize the network service, a merchant, for instance, subscribes to a computer system of a selected the service provider and obtains software (and alternatively or concurrently, hardware) necessary for interfacing with operations of the service provider. More particularly, the software enables communication between a merchant-subscriber computer system and a service provider computer system over an interactive communications network. The merchant then installs the software on subscriber system 101. Preferably, the subscriber's computer system is Web-compatible, i.e., suitable for establishing conventional Web-based communications with the service provider.

In addition, the service provider system is equipped with modular software, namely, a plurality of functional modules for operating in a network, i.e., Web-based environment. Each time the subscriber undertakes a transaction, subscriber system 101 sends a transaction request, in message or document form, to the service provider system using conventional Web protocols (e.g., HTTP Post). For example, a transaction request is an XML-based message file or document containing or identifying a selected class of goods (e.g., clothes), the value of a selected item of the goods, the subscriber location, the subscriber's taxpayer identification number (and/or subscriber's account number with the service), the time of the message, the date and the shipping location. The service provider system, in turn, transmits this information to the tax computation module. This module calculates the amount of sales and/or use tax due (for each applicable city, state and/or territory) and transmits an appropriate XML-based reply to the subscriber which includes the sales and/or use tax due and total amount of the transaction.

Thereafter, the subscriber system displays to the subscriber via the network browser the total amount due and accepts the message for consummation of the transaction. If consummation has occurred, another XML-based message is formulated by the subscriber system and sent back to the service provider system for activation of the tax reporting module and the tax payment module.

The tax payment module effects the electronic transfer of funds corresponding to the amount of taxes to be paid to a service provider account. In particular, at selected intervals (e.g., weekly, bi-weekly, monthly or quarterly) and upon the aggregation or accumulation of funds in the selected account of an intermediary financial institution, effects transfer of those funds, payment of the tax owed, to the government authority. It is preferred that each tax authority be given audit capability and report generation capability through direct access to the subscriber reporting module. Optionally, the subscriber may request reporting of information to determine the amount of taxes paid for the current fiscal year or other selected time period.

Alternatively or concurrently, the return-generating module automatically, at selected intervals (again, e.g., weekly, bi-weekly, monthly or quarterly), generates and electronically files appropriate tax return information with the selected government authorities.

Although the present invention has been shown and described in connection with various functional modules operating on a server of a service provider, it is understood that one or more such modules may be provided, alternatively or concurrently therewith, on a server of subscriber system 101, within the spirit and scope of the present invention.

Figure 10:
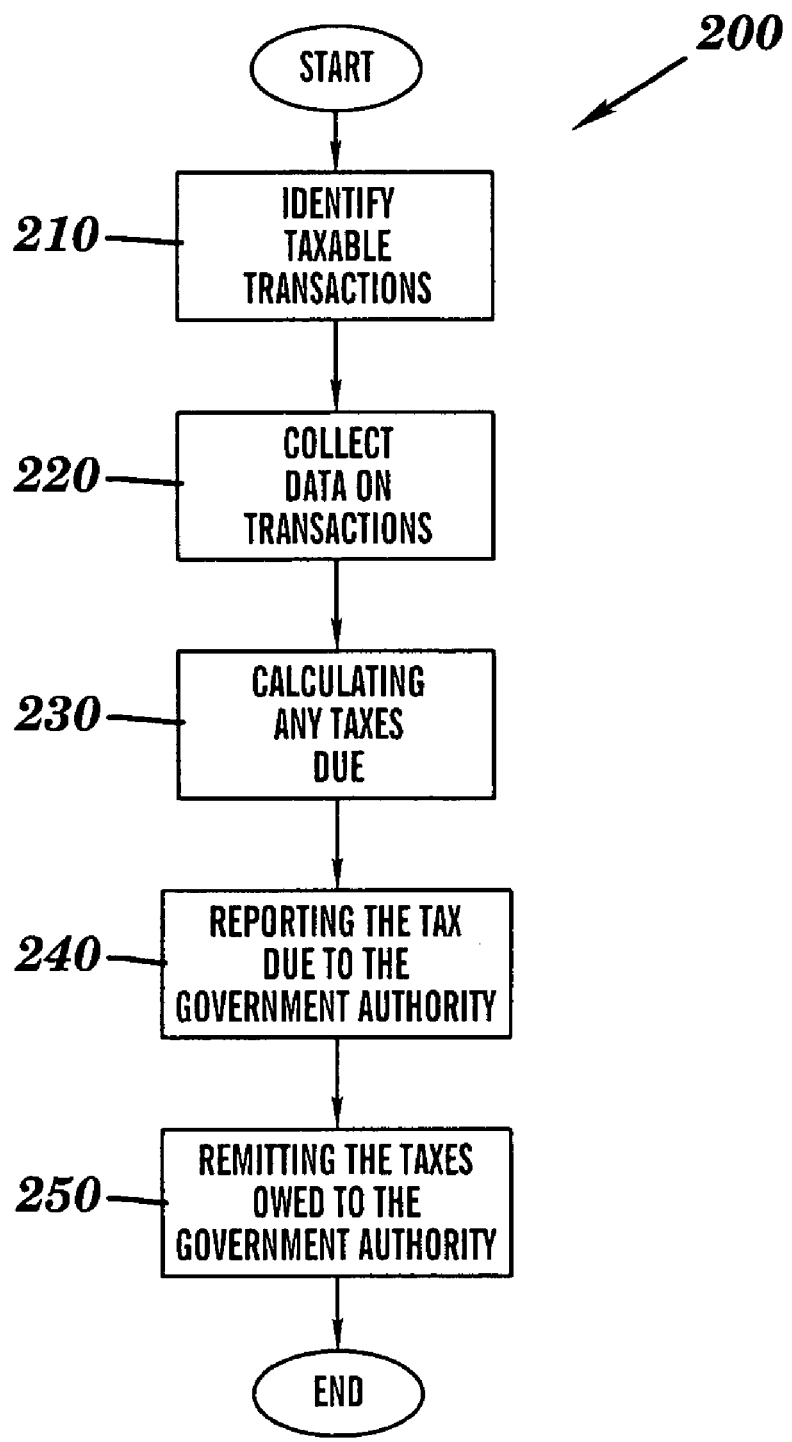
FIG. 10 is a process flow diagram showing a method for calculating taxes due on financial transactions, reporting the same to a selected government authority, and periodically remitting the tax owed over an interactive communications, in accordance with a further aspect of the present invention.
Figure 11:
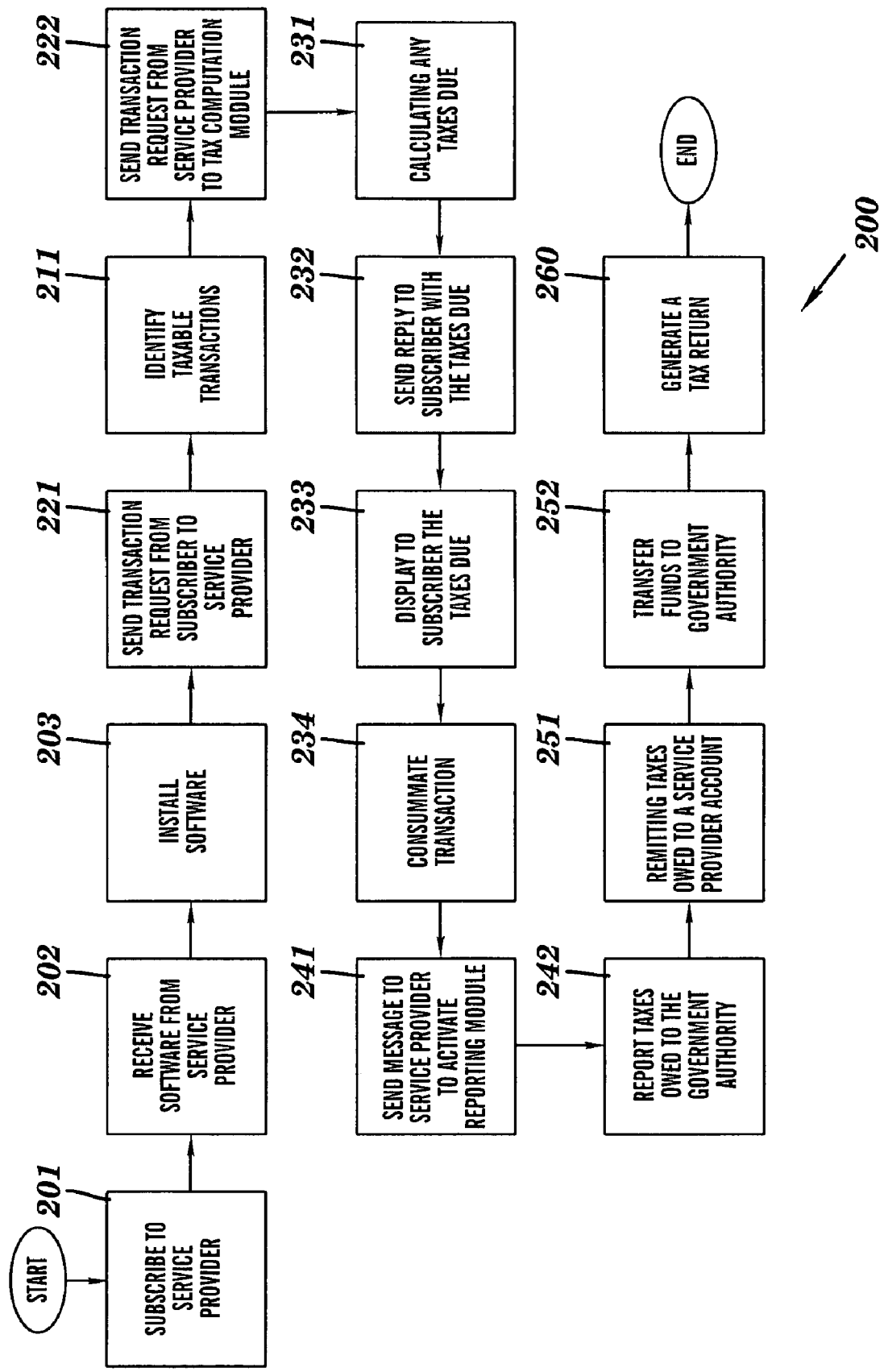
FIG. 11 is a process flow diagram showing the method set forth in FIG. 10, according to still another aspect of the present invention.

Turning now to another aspect of the present invention, as shown in FIG. 10, method 200 is provided for identifying 210 taxable financial transactions, collecting 220 data based on the transactions, calculating 230 any taxes due on the transactions, reporting 240 the same to selected government authority 30, and periodically remitting 250 the tax owed over interactive communications network 20. Initially, and with more particularity, a subscriber subscribes 201 to service provider computer system 102. A method of this general description is illustrated in FIG. 11. Software is preferably provided 202 by the service provider and loaded 203 onto subscriber computer system 101 so as to enable communications between the subscriber system and the service provider system over the interactive communications network. To initiate operation, the subscriber system sends 221 an XML-based transaction request from subscriber system 101 to the service provider system. In one embodiment, the message identifies 211, for example, the class of goods being transacted, the value of a selected item of the goods, the subscriber location, the subscriber's identification number, the time of the message, the date and the shipping location. The next step is to send 222 the XML-based transaction request from the service provider system to a tax computation module, and then calculates 231 any tax due, e.g., sale and/or use tax, on each taxable transaction in each applicable jurisdiction. A responsive XML-based reply is sent 232 to the subscriber system, the reply including such tax due and the total amount due for the transaction. The subscriber system, in turn, displays 233 the sales and/or use tax and total amount due for the transaction and executes the step of accepting 234 the reply message so as to consummate the transaction.

Thereafter, the subscriber system sends 241 a second XML-based message to the service provider system for activating a module for reporting 242 the tax owed to a selected government authority. Desirably, this message also initiates operation of a module for periodically remitting the tax owed over an interactive communications network. Next, funds corresponding to the amount of the tax owed are transferred 251 to a service provider account, preferably a conventional, electronic bank account maintained at a member financial institution, e.g., Citigroup, as part of automated clearinghouse network 90. Periodically, funds are transferred 252 from the service provider account to the government authority in payment of the tax owed. Finally, and also periodically, the system electronically generates and reports 260 tax return information to the selected government authority.

At the kernel of the present invention is an automatic (real-time or periodic) tax calculation, reporting and payment scheme for transmitting tax related information and funds to state and federal government's treasuries on each taxable transaction of the subscriber. This virtually eliminates the need for the subscriber to manually file an annual tax return.

In another embodiment, the above-described method is performed by machine code, in modular form, resident on a server of the service provider, hence, a service provider module version. Similarly, one or more such modules may be resident on the subscriber or subscriber system, i.e., a subscriber module version. It is preferred that the subscriber module reside on a computer system, e.g., an HP 9000 Server or HP Netserver such as the O. C. Tanner Virtual Store at www.octanner.com, and/or a computerized cash register bank or network, e.g., an in-store processor including an HP 9000 Server linked via intranet with a plurality of conventional NCR computer cash registers, for effective transmission of each transaction to the provider module. The service provider module desirably also resides on a computer system, e.g., HP 9000 Server or the like.

Although the present invention has been shown and described in connection with a land-line, Web-based network, it will be understood by those skilled in the art that other methods could be utilized, giving consideration to the purpose for which the present invention is intended. For instance, a wireless communications network or a combination land-based and wireless network could be used, within the spirit and scope of the present invention.

In accordance with another feature of the present invention, each time a transaction is undertaken by (or with) the subscriber, the subscriber system electronically transmits the transaction request or message file to the service provider system, e.g., by sending an e-mail message, making a dial-up connection or the like. A transaction request is preferably an XML-based data file that contains data describing, for instance, the type of goods (e.g., food), the value of a selected item of the goods, the subscriber location, the subscriber taxpayer number (or account number with the service provider), the time and date information as well as the shipping location. In response, the service provider's system delivers this information to a sales and/or use tax computation module. For instance, this module determines the sales and/or use tax for the transaction performed in each applicable jurisdiction (where the transaction occurred in multiple tax districts), the tax rate and formats. It then sends an XML-based reply to the subscriber. The subscriber system displays to its customer, preferably through a Web browser, the total amount due and other tax related details. The customer then decides whether or not to consummate the transaction. If the consumer accepts the transaction, then a new XML-based message is sent from the customer to the service provider which stores the record of the transaction in a database.

It is desirable that at regular intervals (e.g., daily, weekly, monthly or quarterly), the sales and/or use tax computation module send XML-based transaction requests or like instructions to the system of the present invention to transfer appropriate funds, over the ACH network, to a service provider account. Instructions are also provided to electronically pay the appropriate local, state and/or federal government authorities, e.g., government treasuries. Each authority preferably has audit and report generation capability through direct tax authority access to the client-reporting module. Also, the client may request that the transaction be reported to selected government authorities so as to determine the amount of taxes paid for the current fiscal period. Optionally, the return-generating module may periodically (e.g., quarterly, semi-annually or annually) automatically generate and electronically file appropriate tax return information with the appropriate authorities.

Turning now to a further aspect of the present invention, system hardware preferably defines three discrete operating environments, namely, two Unix-based systems and one Windows NT server. The first Unix-based system, which is dedicated to sales and/or use tax computation operations, uses a conventional, high-performance operating system such as HP-UX 11.0 or the like. A Web server, for instance, IPlanet Web Server 4.1 SP5 is used as well as an Oracle 8i database or the like equipped with Java 1.2.2.8. Desirably, in one embodiment, system applications software includes PL/SQL, Genie, TaXML, Financial Link and XMLPost.

The second Unix-based system also utilizes a conventional Unix operating system such as HP-UX 11.0 and is dedicated to sales and/or use tax remittance functions. It is also desirable that the system utilize an Application Server, e.g., an HP BlueStone TeS 7.3 or a WebLogic Web Server 5.1.0, an A-Class HP 9000 Server or the like, an Oracle V 8.1.6 database, and Java 1.2.2.8. In addition, it is preferred that the system applications software comprises various off-the-shelf routines such as Saxon 5.5.1, XML Convert 2, JDOM XML Parser b6, and Commpress 2000.

Third, a Windows NT server, e.g., an IIS 4.0 or the like, is preferably used to sales and/or use tax reporting function. This server has a conventional operating system such as an NT 4.x w/SP 6 & option pack. As with the Unix-based systems above, an Oracle 8i Client database with Java 1.2.2.8 is desired. Preferred application software for the server is Crystal Reports 8.0.

This arrangement, in supporting both conventional, Web-based software and batch mode software, offers numerous competitive advantages. First, when utilizing a conventional tax calculation system, for instance, an XML message request is sent to the system of the present invention, which, in turn, replies with an XML message response. This on-line capability facilitates an immediate system response to any transaction request, whether an error message, a rejection, or accepted transaction identifier. Moreover, while the automated clearinghouse network, a concept that was developed in the 1970's for batch processing only, in particular, so that very large volume payments could be reliably processed at a relatively low cost, as a result of the present invention, any on-line XML transaction request may now be transformed into an automated clearinghouse network TXP batch file. In this manner, the present invention essentially transforms that system from a batch-only operation into one that can repeatedly handle individual on-line transactions.

As for the methods of the present invention, they also offers may benefits over conventional methods of tax preparation and reporting. First, it enables subscribers to electronically outsource the burden of sales and/or use tax calculation and remittance to state-certified service providers. In this manner, subscribers need not determine the tax rates applicable to each sales transaction, nor otherwise preoccupy themselves with regional tax laws. Subscribers also need not be concerned about the accuracy of the information they provide to government authorities.

A second benefit is that subscribers may now significantly reduce their internal information technology expenses since they no longer need to maintain an in-house, internally-developed sales and/or use tax calculation system. Furthermore, the invention significantly reduces the audit exposure of participating subscribers since municipalities, states and other government authorities may now have access to complete transaction records electronically maintained by the service provider and, thus, may issue audit waivers to participating subscribers.

Finally, at the kernel of the present invention is the use of free public domain, commonly off-the-shelf (COTS) technologies, open source and other industry standard software, rather than proprietary, subscriber-specific software, such that long term supportability is assured. Examples include, but are not limited to, XML, XML/DTD, ACH/TXP, Java, JSP and J2EE, e.g., Java 1.2, HTTP Post, SOAP, Secure Shell (SSH), SSLv3, Sudo and Apache web server software, e.g., HP-UX 11.0, and oracle database software, e.g., Oracle V 8.1.6. This reduces considerably their system development and deployment costs.

In addition, subscribers no longer must purchase tax software for each business application in their portfolio, no longer require dedicated information technology resources to administer tax systems, and no longer must build custom components to integrate tax software with their specialized business applications.

Instead, a Web service (or e-service) is provided for automatically, securely and efficiently remitting sales and/or use tax data for the subscriber. The service is readily accessible, i.e., publically over the Internet, requires only a conventional Internet browser, e.g., Microsoft Internet Explorer, yet maximum system and data security is provided. Unlike prior systems, no specialized communications equipment, dedicated phone line, or other independent setup is required. This virtually eliminates startup costs and other large expenses usually associated with new communications systems.

The present invention's use of industry standard tools for implementing security is another helpful aspect. In particular, it is preferred that data encryption be provided by SSLv3. Authentication desirably is provided by digital certificate, public/private key authentication of SSH. Additionally, non-repudiation and data integrity security are provided by digital signature. Finally, audit security is facilitated by logging, as will be understood by those skilled in the art.

Accordingly, relatively strong protection from fraud is also provided. First, the present invention requires off-line registration of each subscriber. In particular, each subscriber must supply a federal tax I.D. and state tax I.D.'s which are securely stored in the database server. This information is also contained in a TXP file for sales and/or use tax remittance to the automated clearinghouse network. In this manner, not only is the accuracy of the amount of sales and/or use tax remitted to the state insured, but also payment is attributed to the correct subscriber. Second, debiting from the automated clearinghouse network is always from the subscriber to the holding account. Third, the automated clearinghouse network credit is, in turn, always from the holding account to the states only. Fourth, the present invention utilizes a closed-loop system in which funds may only be transferred from a known and pre-registered bank account to another known and preregistered bank account. Finally, at least one selected, authorized person must approve each fund transfer to the automated clearinghouse network.

Overall, the present invention advantageously insures that tax computations, which were previously done manually, are done quickly, effectively, correctly and relatively paperlessly. It also provides that tax reporting is accomplished timely, without tardiness or loss in the mail, that any additional taxes due are paid, and eliminates penalties for late or incorrect tax payments. Collection of taxes by government treasuries is insured as taxes are paid directly via electronic funds transfer to the treasuries. Moreover, sales tax on transactions conducted over the Internet, that were previously uncollectible by states, may be paid without additional effort by the subscriber or customer.

Various modifications and alterations to the present invention may be appreciated based on a review of this disclosure. These changes and additions are intended to be within the scope and spirit of this invention as defined by the following claims.

What is claimed is:

1. An intelligent, program controlled system having modular programming for automatically identifying taxable financial transactions, collecting data based on the transactions, calculating in real-time any taxes due on the transactions, reporting the same to a selected government authority, and periodically remitting funds corresponding to the tax owed to the government authorities over an interactive communications network, the system comprising:
   a first server associated with a merchant and hosting a first virtual portal, the first virtual portal having at least one application for providing e-content to end users, the application including a network browser for accessing, displaying and transmitting data over the network; and
   a service provider computer system associated with a service provider to which the merchant is subscribed, the service provider computer system comprising:
      a second server hosting a second virtual portal, the second virtual portal having at least one application for receiving data from the first server and for parsing the data received;
      a communications infrastructure linking the first and second servers to one another;
      a third server hosting a third virtual portal, the third virtual portal having at least one application for receiving transactional data from the second server, parsing the transactional data received for XML-based data, interpreting the XML-based data for selected data processing operations, storing the XML-based data in a first selected file of a first database, computing any taxes due on the corresponding transaction, and storing the tax due in a second selected first database file; and
      a fourth server hosting a fourth virtual portal, the fourth virtual portal having at least one application for receiving XML-based data from the third server, converting the second selected first database file from an XML-based format to a TXP-based format for receipt by an automated clearinghouse network, and periodically transmitting the second file, through the network, to a selected financial institution for remission of funds corresponding to the transactional data to the government authority.

2. The intelligent, program controlled system of claim 1, wherein the service provider computer system further comprises an automated tax return generation and electronic filing system to generate and electronically file a periodic tax return with the selected government authority.

3. The intelligent, program controlled system of claim 2, wherein the service provider computer system further comprises a reporting system to generate a report of taxes due to the selected government authority.

4. The intelligent, program controlled system of claim 1, further comprising at least one other first server associated with a second merchant that is subscribed to the service provider computer system, the second virtual portal to further receive data from the at least one other first server and to parse the data received from the at least one other server.

5. An intelligent, program controlled system having modular programming for automatically identifying taxable financial transactions, collecting data based on the transactions, calculating in real-time any taxes due on the transactions, reporting the same to a selected government authority, and periodically remitting funds corresponding to the tax owed to the government authorities over an interactive communications network, the system comprising:
   a first server associated with a merchant and hosting a first virtual portal, the first virtual portal having at least one application for providing e-content to end users, the application including a network browser for accessing, displaying and transmitting data over the network;
   a service provider computer system associated with a service provider to which the merchant is subscribed, the service provider computer system comprising:
      a second server hosting a second virtual portal, the second virtual portal having at least one application for receiving data from the first server and for parsing the data received;
      a communications infrastructure linking the first and second servers to one another;
      a third server hosting a third virtual portal, the third virtual portal having at least one application for receiving transactional data from the second server, parsing the transactional data received for XML-based data, interpreting the XML-based data for selected data processing operations, storing the XML-based data in a first selected file of a first database, computing any taxes due on the corresponding transaction, and storing the tax due in a second selected first database file;
      a fourth server hosting a fourth virtual portal, the fourth virtual portal having at least one application for receiving XML-based data from the third server, converting the second selected first database file from an XML-based format to a TXP-based format for receipt by an automated clearinghouse network, and periodically transmitting the second file, through the network, to a selected financial institution for remission of funds corresponding to the transactional data to the government authority;

a fifth server hosting a fifth virtual portal, the fifth virtual portal having at least one application redundant to that of the third server; and a sixth server hosting a sixth virtual portal, the sixth virtual portal having at least one application redundant to that of the fourth server.

6. An intelligent, program controlled system having modular programming for automatically identifying taxable financial transactions, collecting data based on the transactions, calculating in real-time any taxes due on the transactions, reporting the same to a selected government authority, and periodically remitting funds corresponding to the tax owed to the government authorities over an interactive communications network, the system comprising:

a first server associated with a merchant and hosting a first virtual portal, the first virtual portal having at least one application for providing e-content to end users, the application including a network browser for accessing, displaying and transmitting data over the network; and a service provider computer system associated with a service provider to which the merchant is subscribed, the service provider computer system comprising:

a second server hosting a second virtual portal, the second virtual portal having at least one application for receiving data from the first server and for parsing the data received;

a communications infrastructure linking the first and second servers to one another;

a third server hosting a third virtual portal, the third virtual portal having at least one application for receiving transactional data from the second server, parsing the transactional data received for XML-based data, interpreting the XML-based data for selected data processing operations, storing the XML-based data in a first selected file of a first database, computing any taxes due on the corresponding transaction, and storing the tax due in a second selected first database file; and a fourth server hosting a fourth virtual portal, the fourth virtual portal having at least one application for receiving XML-based data from the third server, converting the second selected first database file from an XML-based format to a TXP-based format for receipt by an automated clearinghouse network, and periodically transmitting the second file, through the network, to a selected financial institution for remission of funds corresponding to the transactional data to the government authority; and at least one application for insuring system security over the interactive communications network, for system backup and recovery operations, for system real-time and continuous accessibility, for operating system monitoring and for system load balancing and scalability.

7. An intelligent, program controlled system having modular programming for automatically identifying taxable financial transactions, collecting data based on the transactions, calculating in real-time any taxes due on the transactions, reporting the same to a selected government authority, and periodically remitting funds corresponding to the tax owed to the government authority over an interactive communications network, the system comprising:

a first server associated with a merchant and hosting a first virtual portal, the first virtual portal having at least one application for providing e-content to end users, the application including a network browser for accessing, displaying and transmitting data over the network;

a service provider computer system associated with a service provider to which the merchant is subscribed, the service provider computer system comprising:

a second server hosting a second virtual portal, the second virtual portal having at least one application for receiving data from the first server and for parsing the data received;

a communications infrastructure linking the first and second servers to one another;

a third server hosting a third virtual portal, the third virtual portal having at least one application for receiving data from the second server, parsing the data received for XML-based data and interpreting the XML-based data for selected data processing operations; and a fourth server processing XML-based data from the third server, the fourth server including a network service module having a plurality of modular functions, which comprise an applications module, a database module, a tax computation module and a tax remittance module, the service module receiving XML-based transactional data, storing the transactional data in a first selected file of the database, computing any taxes due on the corresponding transaction, storing the tax due in a second selected file of the database, converting the second file from an XML-based format to a TXP-based format for receipt by an automated clearinghouse network, and periodically transmitting the second file, through the network, to a selected financial institution for remission of funds corresponding to the transactional data to the government authority; and an infrastructure service module having a series of discrete modular functions including a security module for insuring system security over the interactive communications network, a system backup and recovery module, a real-time and continuous accessibility module, a system monitoring module and a system load balancing and scalability module.

8. An intelligent, program controlled system having modular programming for automatically identifying taxable financial transactions, collecting data based on the transactions, calculating in real-time any taxes due on the transactions, reporting the same to a selected government authority, and periodically remitting funds corresponding to the tax owed to the government authority over an interactive communications network, the system comprising:

a first server associated with a merchant and hosting a first virtual portal, the first virtual portal having at least one application for providing e-content to end users, the application including a network browser for accessing, displaying and transmitting data over the network;

a service provider computer system associated with a service provider to which the merchant is subscribed, the service provider computer system comprising:

a second server hosting a second virtual portal, the second virtual portal having at least one application for receiving data from the first server and for parsing the data received;

a communications infrastructure linking the first and second servers to one another;

a third server hosting a third virtual portal, the third virtual portal having at least one application for receiving data from the second server, parsing the data received for XML-based data and interpreting the XML-based data for selected data processing operations; and a fourth server processing XML-based data from the third server, the fourth server including a network service module having a plurality of modular functions, which comprise an applications module, a database module, a tax computation module and a tax remittance module, the service module receiving XML-based transactional data, storing the transactional data in a first selected file of the database, computing any taxes due on the corresponding transaction, storing the tax due in a second selected file of the database, converting the second file from an XML-based format to a TXP-based format for receipt by an automated clearinghouse network, and periodically transmitting the second file, through the network, to a selected financial institution for remission of funds corresponding to the transactional data to the government authority; and an infrastructure service module having a series of discrete modular functions including a security module for insuring system security over the interactive communications network, a system backup and recovery module, a real-time and continuous accessibility module, a system monitoring module and a system load balancing and scalability module;

a fifth server hosting a fifth virtual portal, the fifth virtual portal having at least one application redundant to that of the third server; and a sixth server hosting a fifth virtual portal, the sixth virtual portal having at least one application redundant to that of the fourth server.

9. An intelligent, program controlled system having modular programming for automatically identifying taxable financial transactions, collecting data based on the transactions, calculating in real-time any taxes due on the transactions, reporting the same to a selected government authority, and periodically remitting funds corresponding to the tax owed to the government authority over an interactive communications network, the system comprising:

a first server associated with a merchant and hosting a first virtual portal, the first virtual portal having at least one application for providing e-content to end users, the application including a network browser for accessing, displaying and transmitting data over the network;

a service provider computer system associated with a service provider to which the merchant is subscribed, the service provider computer system comprising:

a second server hosting a second virtual portal, the second virtual portal having at least one application for receiving data from the first server and for parsing the data received;

a communications infrastructure linking the first and second servers to one another;

a third server hosting a third virtual portal, the third virtual portal having at least one application for receiving data from the second server, parsing the data received for XML-based data and interpreting the XML-based data for selected data processing operations; and a fourth server hosting a fourth virtual portal, the fourth virtual portal having at least one application for processing XML-based data from the third server, the fourth server including a network service module having a plurality of modular functions, which comprise an applications module, a database module, a tax computation module and a tax remittance module, the service module receiving XML-based transactional data, storing the transactional data in a first selected file of the database, computing any taxes due on the corresponding transaction storing the tax due in a second selected file of the database, converting the second file from an XML-based format to a TXP-based format for receipt by an automated clearinghouse network, and periodically transmitting the second file, through the network, to a selected financial institution for remission of funds corresponding to the transactional data to the government authority; and a fifth server hosting a fifth virtual portal, the fifth virtual portal having at least one application for processing XML-based data from the third server, the fifth server including an infrastructure service module having a series of discrete modular functions, including a security module for insuring system security over the interactive communications network, a system backup and recovery module, a real-time and continuous accessibility module, a system monitoring module and a system load balancing and scalability module.

10. A program controlled apparatus for automatically identifying taxable financial transactions, collecting data based on the transactions, calculating in real-time any taxes due on the transactions, reporting the same to a selected government authority, and periodically remitting funds corresponding to the tax owed to the government authority over an interactive communications network, the apparatus having modular architecture which comprises:

a first device having modular interface programming for a subscriber system that electronically contacts a service provider each time a taxable transaction is initiated, wherein the subscriber system is associated with a merchant that is a subscriber of the service provider;

a service provider computer system associated with the service provider, comprising:

a second device having modular tax computation programming operating on a server of the service provider computer system, the programming identifying the jurisdiction from which the merchandise purchased has been shipped, the jurisdiction to which the merchandise is shipped, the effective tax rates applicable from each jurisdiction;

a third device having modular transaction processing programming for consummating the transaction requested, the modular tax computation programming of the second device calculating any taxes due on the transaction;

a fourth device having modular funds transfer programming for automatically receiving information on the transaction consummation and effecting electronic transfer of the funds corresponding to the taxes due to an account of a selected financial institution;

a fifth device having modular tax payment programming for periodic transfer of funds aggregated in the account to at least one account of the government authority;

a sixth device having modular reporting and/or auditing programming for generating interactive reports and for permitting auditing by the government authority; and a seventh device having modular tax return programming for automated generation of a tax return and transmitting the return electronically to the government authority.

11. A program controlled system having modular architecture for automatically identifying taxable financial transactions, collecting data based on the transactions, calculating in real-time any taxes due on the transactions, reporting the same to a selected government authority, and periodically remitting funds corresponding to the tax owed to the government authority over an interactive communications network, the system comprising:

- a first device having modular interface programming for a subscriber system that electronically contacts a service provider each time a taxable transaction is initiated, wherein the subscriber system is associated with a merchant that is a subscriber of the service provider;
- a service provider computer system associated with the service provider, comprising:
  - a second device having modular tax computation programming operating on a server of the service provider computer system, the programming identifying the jurisdiction from which the merchandise purchased has been shipped, the jurisdiction to which the merchandise is shipped, the effective tax rates applicable from each jurisdiction;
  - a third device having modular transaction processing programming for consummating the transaction requested, the modular tax computation programming of the second device calculating any taxes due on the transaction;
  - a fourth device having modular funds transfer programming for automatically receiving information on the transaction consummation and effecting electronic transfer of the funds corresponding to the taxes due to an account of a selected financial institution;
  - a fifth device having modular tax payment programming for periodic transfer of funds aggregated in the account to at least one account of the government authority;
  - a sixth device having modular reporting and auditing programming for generating interactive reports and for permitting auditing by the government authority; and
  - a seventh device having modular tax return programming for automated generation of a tax return and transmitting the return electronically to the government authority.

* * * * *